(12) United States Patent
Olsson et al.

(10) Patent No.: US 12,377,430 B1
(45) Date of Patent: *Aug. 5, 2025

(54) TRACKABLE DIPOLE DEVICES, METHODS, AND SYSTEMS

(71) Applicant: SeeScan, Inc., San Diego, CA (US)

(72) Inventors: Mark S. Olsson, La Jolla, CA (US); Jan Soukup, San Diego, CA (US); James F. Kleyn, Santee, CA (US)

(73) Assignee: SeeScan, Inc., San Diego, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/430,455

(22) Filed: Feb. 1, 2024

Related U.S. Application Data

(63) Continuation of application No. 17/467,435, filed on Sep. 6, 2021, now Pat. No. 11,904,335, which is a
(Continued)

(51) Int. Cl.
*C23C 16/00* (2006.01)
*B05B 9/01* (2006.01)
(Continued)

(52) U.S. Cl.
CPC .............. *B05B 12/122* (2013.01); *B05B 9/01* (2013.01); *B05B 12/002* (2013.01); *B05D 1/02* (2013.01); *B65D 83/184* (2025.01); *E01C 23/222* (2013.01); *G01V 3/12* (2013.01); *G01V 3/165* (2013.01)

(58) Field of Classification Search
CPC ....... B05B 12/122; B05B 12/002; B05B 9/01; B65D 38/184; B05D 1/02; E01C 23/222; G01V 3/12; G01V 3/165
See application file for complete search history.

(56) References Cited

U.S. PATENT DOCUMENTS

| 3,270,369 A | 9/1966 | Mandell |
| 3,310,264 A | 3/1967 | Appleton |

(Continued)

FOREIGN PATENT DOCUMENTS

| EP | 1852365 A1 | 11/2007 |
| WO | WO 9112119 | 8/1991 |
| WO | WO 9424584 | 3/1994 |

OTHER PUBLICATIONS

Bearden, Tom, "New Identification Technology Raises Concerns Over Privacy," PBS Online NewsHour, Aug. 17, 2006, pp. 1-2, http://www.pbs.org/newshour/bb/science-july-dec06-rfid_08-17.html.
(Continued)

*Primary Examiner* — Mark Hellner

(74) *Attorney, Agent, or Firm* — Steven C. Tietsworth, Esq.; Michael J. Pennington, Esq.

(57) ABSTRACT

Location systems and methods for locating paint and other markings on a surface are disclosed. A paint marking stick may include a magnetic field sonde that is actuated in conjunction with dispensing of paint or other markers, where the sonde generates a magnetic field signal in conjunction with dispensing of paint or placement of a marker. A corresponding utility locator may receive the sonde magnetic field dipole signal and determine and store positional information and type information associated with the paint or other marker.

19 Claims, 28 Drawing Sheets

Related U.S. Application Data continuation of application No. 16/160,874, filed on Oct. 15, 2018, now Pat. No. 11,117,150, which is a continuation of application No. 15/623,174, filed on Jun. 14, 2017, now Pat. No. 10,105,723.

(60) Provisional application No. 62/350,147, filed on Jun. 14, 2016.

(51) Int. Cl.
| | |
|---|---|
| B05B 12/00 | (2018.01) |
| B05B 12/12 | (2006.01) |
| B05D 1/02 | (2006.01) |
| B65D 83/184 | (2025.01) |
| E01C 23/22 | (2006.01) |
| G01V 3/12 | (2006.01) |
| G01V 3/165 | (2006.01) |

(56) References Cited

U.S. PATENT DOCUMENTS

| | | | |
|---|---|---|---|
| 3,485,206 A | 12/1969 | Smrt | |
| 3,871,557 A | 3/1975 | Smrt | |
| 3,972,038 A | 7/1976 | Fletcher | |
| 3,974,491 A | 8/1976 | Sipe | |
| 4,258,320 A | 3/1981 | Schonstedt | |
| 4,387,340 A | 6/1983 | Peterman | |
| 4,388,592 A | 6/1983 | Schonstedt | |
| 4,520,317 A | 5/1985 | Peterman | |
| 4,536,710 A | 8/1985 | Dunham | |
| 4,539,522 A | 9/1985 | Schonstedt | |
| 4,590,425 A | 5/1986 | Schonstedt | |
| 4,639,674 A | 1/1987 | Rippingale | |
| 4,712,094 A | 12/1987 | Bolson, Sr. | |
| 4,747,207 A | 5/1988 | Schonstedt | |
| 4,803,773 A | 2/1989 | Schonstedt | |
| 4,818,944 A | 4/1989 | Rippingale | |
| 4,839,623 A | 6/1989 | Schonstedt | |
| 4,839,624 A | 6/1989 | Schonstedt | |
| 5,001,430 A | 3/1991 | Peterman | |
| 5,006,806 A | 4/1991 | Rippingale | |
| 5,014,008 A | 5/1991 | Flowerdew | |
| 5,017,873 A | 5/1991 | Rippingale | |
| 5,043,666 A | 8/1991 | Tavernetti | |
| 5,045,368 A | 9/1991 | Cosman | |
| 5,065,098 A | 11/1991 | Salsman | |
| 5,093,622 A | 3/1992 | Balkman | |
| 5,097,211 A | 3/1992 | Schonstedt | |
| 5,114,517 A | 5/1992 | Rippingale | |
| 5,122,750 A | 6/1992 | Rippingale | |
| 5,136,245 A | 8/1992 | Schonstedt | |
| 5,368,202 A | 11/1994 | Smrt | |
| 5,918,565 A | 7/1999 | Casas | |
| 6,053,260 A | 4/2000 | Boon | |
| 6,064,940 A | 5/2000 | Rodgers | |
| 6,294,022 B1 | 9/2001 | Eslambolchi | |
| 6,437,708 B1 | 8/2002 | Brouwer | |
| 6,723,375 B2 | 4/2004 | Zeck | |
| 6,766,253 B2 | 7/2004 | Burns | |
| 7,009,399 B2 | 3/2006 | Olsson | |
| 7,048,151 B1 | 5/2006 | Wertz | |
| 7,175,104 B2 | 2/2007 | Allen, IV | |
| 7,175,106 B2 | 2/2007 | Roman | |
| 7,372,247 B1 | 5/2008 | Giusti et al. | |
| 7,640,105 B2 | 12/2009 | Nielsen | |
| 7,930,103 B2 | 4/2011 | Young | |
| 8,118,192 B2 | 2/2012 | Daugherty | |
| 8,146,068 B2 | 3/2012 | Tal | |
| 8,290,204 B2 | 10/2012 | Nielson | |
| 8,401,791 B2 | 3/2013 | Nielson | |
| 8,407,001 B2 | 3/2013 | Nielson | |
| 8,478,523 B2 | 7/2013 | Nielsen | |
| 9,542,863 B2 * | 1/2017 | Nielsen | G01C 15/06 |
| 10,105,723 B1 * | 10/2018 | Olsson | B05B 12/122 |
| 11,117,150 B1 * | 9/2021 | Olsson | B65D 83/184 |
| 11,904,335 B1 * | 2/2024 | Olsson | B65D 83/184 |
| 2009/0204238 A1 | 8/2009 | Nielsen | |
| 2009/0208642 A1 | 8/2009 | Nielsen | |
| 2010/0198663 A1 | 8/2010 | Nielsen | |
| 2010/0272885 A1 * | 10/2010 | Olsson | B05B 15/62 |
| | | | 118/75 |
| 2011/0109437 A1 * | 5/2011 | Olsson | G01V 3/15 |
| | | | 340/8.1 |

OTHER PUBLICATIONS

Advanced Mapping, Underground Utility Mapping Specialists, internet ad, pp. 1-2.

Common Ground Alliance (CGA), "Best Practices, Version 1.0," Dec. 2003.

Central Valley Chapter California Land Surveyors Association, "Corporate Sponsors," Website, http://www.californiacentralvalleysurveyors.org/corporate_sponsors.shtml.

CMH Underground Utlities Ltd., "Mapping and Location Services," Website, 2012, p. 1, Prince George, BC.

Common Ground Alliance, "Study of One-Call Systems and Damage Prevention Best Practices," Report, Aug. 1999, pp. i-252, United States Department of Transportation's (DOT) Research and Special Programs Administration (RSPA) and Office of Pipeline Safety (OPS), USA.

Federal Highway Administration, "Subsurface Utility Engineering," Website, pp. 1-4, United States Department of Transportation, USA.

Western Kentucky University, "GIS for PDC and Facilities Management," pp. 1-8, http://www.wku.edu/pdc/gis/pdc_gis.pdf, USA.

Rogers, Dr. Christopher, et al, "Mapping the Underworld—Enhancing Subsurface Utility Engineering Performance," 87th Transportation Research Board Conference, 2007, pp. 1-10, TBE Group, Washington DC, USA.

Miss Utility—MD/DC Damage Prevention Committee, "Minutes of Maryland/DC Damage Prevention Meeting," Jan. 24, 2006, pp. 1-3, Hanover, MD, USA.

Miss Utility—MD/DC Damage Prevention Committee, "Minutes of Maryland/DC Damage Prevention Meeting," Sep. 26, 2006, pp. 1-3, Hanover, MD, USA.

Li, Dr. Rongxing, "Mobile Mapping—An Emerging Technology for Spatial Data Acquisition," Academic Paper, Sep. 1997, pp. 1-22, Department of Civil and Environmental Engineering and Geodetic Science, Ohio State University, Columbus, OH, USA.

National Mapping and Spatial Data Committee—AM/FM Technical Sub-Committee, "Standard Guideline for Underground Utility Mapping," Report, May 2006, pp. 1-28, Malaysia.

Cardno Tbe, "Sue Services," Website, pp. 1-3.

Synergy One Locating, "Subsurface Utility Mapping and Locating," Website, pp. 1-2, USA.

Jamil, Hasan, et al., "Underground Utility Mapping and its Challenges in Malaysia," Engineering Paper, 2012, pp. 1-15, Department of Survey and Mapping Malaysia, Malaysia.

Jamil, Hasan, et al., "Underground Utility Mapping and its Challenges in Malaysia," Presentation, May 2012, pp. 1-27, Department of Survey and Mapping Malaysia, Malaysia.

* cited by examiner

TRACKABLE DIPOLE DEVICES, METHODS, AND SYSTEMS

CROSS-REFERENCE TO RELATED APPLICATIONS

This application claims priority under 35 U.S.C. § 119 (e) to co-pending U.S. Provisional Patent Application Ser. No. 62/350,147, entitled TRACKABLE DIPOLE DEVICES, METHODS, AND SYSTEMS FOR USE WITH MARKING PAINT STICKS, filed on Jun. 14, 2016, the content of which is hereby incorporated by reference herein in its entirety for all purposes.

FIELD

This disclosure relates generally to paint marking sticks and attachments used with paint sticks and other marking devices. More specifically, but not exclusively, the disclosure relates to magnetic field dipole tracking devices for use with paint marking sticks to generate electromagnetic signals in conjunction with deployment of paint markings on roadway or other surfaces to aid in electronically recording information about the mark and associated position in relative or absolute coordinates.

BACKGROUND

Paint marking sticks (also denoted herein as "marking paint sticks" or "paint sticks" for brevity) are used in locating operations to create paint marks corresponding with locations of interest, such as the locations of underground pipes, power lines, or other utilities or hidden or buried objects. Paint marks deployed by these paint sticks are intended to correspond to the position of a buried utility or other buried asset as seen at the ground surface. Paint marks may also provide information about the utility line or other buried asset (e.g., color coding of marks to show utility type, writing out or abbreviating utility type or reference numbers in paint, etc.). Paint sticks and associated marks, as well as the systems and methods using them, normally rely on a user re-finding the marks at some time after they have been painted and then trying to interpret the meaning of the mark (e.g., a paint mark may be deployed by a first user, and then at a later date a second user may go to the approximate location and find the mark again for use as a reference point, such as before digging up a street or other surface.

This approach can be inefficient and may suffer from inaccuracies and human error when making each mark and/or when re-finding and interpreting each mark's meaning. Further, this approach relies on the mark being accurately placed and/or accurately reflecting utility details initially, which may or may not be correct. As a result, current solutions known in the art for improving accuracy, efficiency, and/or reliability leave room for improvement. Furthermore, existing solutions tend to focus solely on paint stick devices and ignore other types of marking devices such as flags or whiskers.

Accordingly, there is a need for improved devices, systems, and methods to address the above described as well as other problems.

SUMMARY

In accordance with various aspects of this disclosure, a trackable dipole device may include a body element and an attachment and retaining element or mechanism for attaching a trackable dipole device to a paint stick or other marking apparatus. The trackable dipole device may be in the form of a readily attachable and removable apparatus (also denoted herein as a "trackable dipole attachment device" or "trackable dipole devices") or, in some embodiments, may be integral with a paint stick or other marking device.

The body element may include an electromagnetic dipole signal transmitter for generating magnetic field signals for detection by a corresponding buried utility locator. The signal transmitter may include a power supply, a modulator/transmitter, and magnetic field dipole antenna, some or all of which may be housed within the body. The signal transmitter may be actuated or controlled through actuation or control of the marking device (typically upon deployment of paint) to generate and broadcast corresponding signals detectable by a utility locator.

One or more utility locator devices, as further described in the incorporated patent and patent applications listed subsequently herein, may receive the transmitted signal or signals and determine and map information about the position of each signal and thereby, information about the location and/or shape and size of each mark. The term "position" as used herein, may refer to a location within three dimensional space as well as an orientation that may describe the direction and tilt at that location.

The body element may also include various other sensors and other components. Such sensors and component may include, but are not limited to, Bluetooth radios/transceivers, WiFi radios/transceivers, and/or other wireless communication devices, cameras and/or other imaging sensors, audio sensors and recorders, gyroscopic sensors, accelerometers, other inertial sensors, and/or global positioning satellite (GPS) sensors or other satellite navigation sensors. The body element may further include a power module containing batteries or other powering components for providing electrical power to the signal transmitter and/or other components of the trackable dipole device.

Data logging components may further be included within the body element of some trackable dipole devices. The retaining element may attach and secure the trackable dipole device to a paint stick or other marking device.

In accordance with one aspect, the trackable dipole device may be adapted for use with a conventional or commercially available paint stick device, such as to operate in conjunction with standard mechanical actuator controls on commercially available paint sticks. The trackable dipole device may further be adapted for use on other types of marking devices such as whisker or flag dispensing marking devices or RFID or other electromagnetic marker devices.

In accordance with one aspect, a system for locating a buried object may include one or more utility locator devices and one or more paint sticks or like marking devices each with a trackable dipole device. The utility locator device may be used to determine locations of interest for applying marks. Upon determining a location of interest, the paint stick or other marking device may be used to apply the mark. Actuation of the marking device may further actuate or control the trackable dipole device causing one or more signals to be generated and broadcasted. The signal or signals may be received at the utility locator device. The utility locator device may determine the position, including orientation, of the trackable dipole device and track the device in three dimensional space based on the received signal or signals relative to the utility locator device. The utility locator device may further determine the relative position of each mark left on the ground's surface based on tracking the position including location and orientation of the trackable dipole device.

In another aspect, the utility locator device of systems and methods herein may be configured to receive the signal or signals from a trackable dipole device while simultaneously receiving signals from other sources such as, but not limited to, buried utility line, pipe sondes, and other system devices and determine the position of each signal. The utility locator device may be equipped with a dodecahedral or similar antenna array and associated components capable of tensor gradient measurements of received signals.

In another aspect, the present disclosure includes methods for determining the position, which includes orientation, of signals received at a utility locator from a trackable dipole device.

In another aspect, actuation or control of a trackable dipole device may be achieved through displacement of a paint canister nozzle. As the nozzle is displaced, causing paint to be dispensed from the paint canister, the trackable dipole device may also be actuated or otherwise controlled. When in the absence of a paint canister, the trigger or like mechanism for actuating the paint stick or other marking device may still actuate or control the trackable dipole device such that a virtual mark may be created in the absence of a physical mark.

In another aspect, the signal transmitter components of the trackable dipole device may be oriented such that the signal axis may approximately center about and align with an axis defined by the direction of marker material (e.g., paint spray) as it exits the marking device. Such signal transmitter components may include an antenna coil where the paint spray passes approximately through the center of the antenna coil. The antenna coil may further tilt to align its transmitted signal axis with the angle at which paint exits the paint canister within a paint stick device.

In another aspect, the antenna, antenna coils, and/or other transmitting element may be in various other orientations generating and broadcasting signal or signals of other orientations relative to the direction and orientation of the marker material as it exits the marking device.

In accordance with another aspect, the trackable dipole device accelerometers, compass sensors, gyroscopic sensors, and/or other like sensors may be included within a trackable dipole device in keeping with the present disclosure. Such sensors may be used to improve accuracy of position, including orientation, tracking.

In accordance with another aspect, the trackable dipole device may include a mounting device for using a smart phone, camera, or like device for recording various aspect of a locating operation where a mark has been created. Such recordings may include capturing images and/or audio correlating to a mark. Such mark correlated recording data may further be communicated with the trackable dipole device, utility locator, mapping systems, other computing systems including cloud based computing platforms, and/or other system devices. In some embodiments, GPS location and/or other system data collected by the smart phone or like device may be shared with such systems and devices.

In accordance with another aspect, the present disclosure may include method(s) and associated system(s) and device(s) for taking audio notes created by a user and further correlating such audio notes with marks, mark location, and/or images of the marks. Text-to-speech (TTS) type or similar translating methods may be used to translate audio files into virtual marks that may further be used in map systems containing utility information.

In accordance with another aspect, the present disclosure may include method(s) and associated system(s) and device(s) for collecting images of the locate and marking location and further correlating such images with the marks, mark locations, and/or locate data. The meaning of paint marks created in a system in keeping with the present disclosure may be translated through optical character recognition technology (OCR) or like methods to create virtual marks that may further be used in map systems containing utility information.

In accordance with another aspect, the present disclosure may include method(s) and associated system(s) and device(s) for tracking movements and orientations of the trackable dipole device and further correlating such data with the marks, mark locations, and/or locate data. Handwriting recognition or like methods for translating movement into written text may be applied to the trackable dipole device movements to create virtual marks that may further be used in map systems containing utility information.

In another aspect, the present disclosure may include a method for verifying the accuracy of and flagging incorrectly placed marks in systems using a trackable dipole device.

In another aspect, the present disclosure may include a method for determining a refined mark location based on offset distance created from tilting of the trackable dipole device.

In accordance with another aspect of the present disclosure, the transmitting element of trackable dipole devices in keeping with the present disclosure may be built into an integrated marking device. Such integrated marking devices may be included or used in the various associated methods and systems in keeping with the present disclosure.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Terminology

Figure 1A:
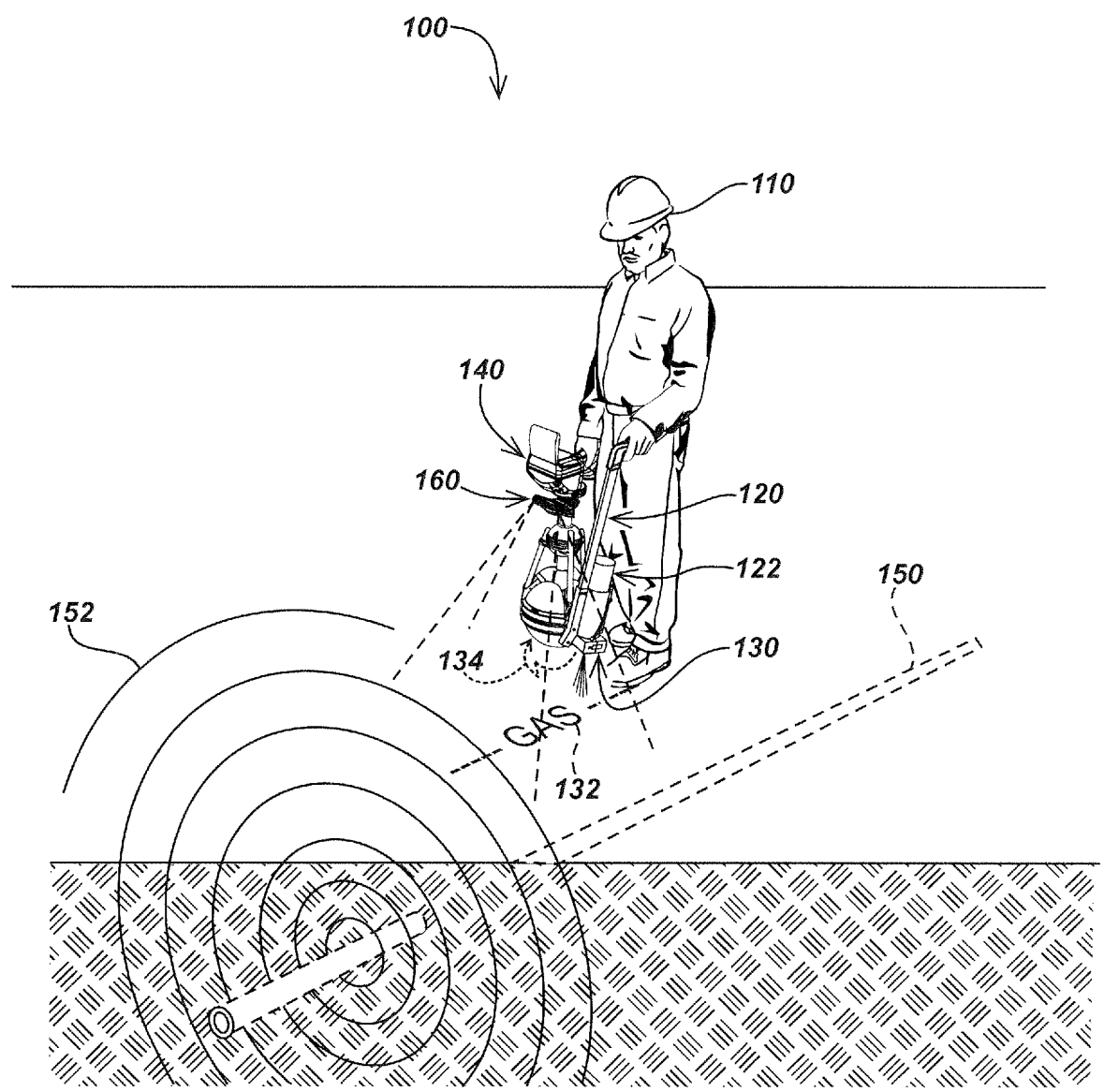
FIG. 1A is an illustration of one embodiment of a utility locating and marking system.

As used herein, the terms "buried objects," "buried assets," and "buried utilities" include electrically conductive objects such as water and sewer lines, power lines, and other buried conductors, as well as objects located inside walls, between floors in multi-story buildings, or cast into concrete slabs. They further include other conductive objects disposed below the surface of the ground. In a typical application a buried object is a pipe, cable, conduit, wire, or other object buried under the ground surface, at a depth of from a few centimeters to meters or more, which has an alternating current flowing in it (the alternating current generates a corresponding electromagnetic field). In a locate operation, a user, such as a utility company employee, construction company employee, homeowner, or other person attempts to find the utility based on sensing of magnetic fields generated by the AC current flow in the utility. The sensed information may be used directly or may be combined with other information to mark the utility, map the utility (e.g., by surface position as defined by latitude/longitude or other surface coordinates, and/or also by depth), and/or for other related purposes.

As noted above, locating buried utilities or other assets may be done by receiving electromagnetic signals emitted from the utilities and then processing these signals in one or more "utility locating devices" (also referred to herein as "utility locators" or simply "locators" for brevity). Utility locators sense the magnetic field component of the electromagnetic signal emitted from a flowing AC current and process the signal accordingly to determine information about the buried object. Typical locators use one or more horizontal antenna elements to determine when the locator is directly above the utility, and then use vertical or omnidirectional antenna coil arrays to determine depth. Applicant's more advanced locators use additional antenna elements, such as multiple omnidirectional antenna arrays, dodecahedral antenna arrays, and other advanced techniques and devices, such as those described in the incorporated applications below, to determine additional information about the buried utilities as well as their associated environment by measuring and processing multiple magnetic field signals in two or three orthogonal dimensions and over time and position.

Utility locators as described herein may be any of the variety described in the incorporated patents and patent applications below, or others as are known or developed in the art. Utility locators include one or more antennas or antenna arrays and electronic circuitry to receive and process magnetic field signal components of electromagnetic signals emitted from multiple sources and/or at multiple frequencies to determine each source's "position" based on its emitted signal(s).

As used herein, the term "position" refers to a location in space, typically in three-dimensional (X, Y, Z coordinates or their equivalent) space, as well as an orientation of the source at that location relative to some other device or location. For example, a signal emitted from a trackable dipole device (also denoted herein as a "trackable dipole attachment device") embodiment coupled to a marking device, or an integrated marking device containing a trackable dipole device, may be used to determine a position that includes a location in three dimensional space relative to a corresponding device, such as an associated utility locator, as well as an orientation describing the direction and degree of tilt of the signal at that location (with respect to the utility locator or some other reference). In this way, the relative position and orientation of the trackable dipole device with respect to the reference sensing position of the utility locator may be precisely determined. Further, absolute positions of the marking device may also be determined in the three dimensional coordinates using position sensing devices, such as GPS and the like.

As used herein, representations of utility lines or other buried assets may be referred to as "marks." Such marks may include physically sprayed or brushed paint marks on the ground or other surface, flags or whisker type markers (e.g., flags on the end of a stick or wire), or other physical marking types known or developed in the art. In addition, "marks" may be in the form of "virtual marks," whereby electronic representations, either in the form of positional data, graphics or other symbols, or both, may correspond to a utility line or other buried asset within an electronic mapping system or other computerized device or system.

Physical and virtual marks may be detected or generated by receiving and processing electromagnetic signals emitted from a trackable dipole device in conjunction with a utility locator.

Overview

This disclosure relates generally to attachable/detachable electromagnetic dipole signal generation devices for use with paint sticks and other marking devices, as well as integrated marking devices, for use in applying paint marking or other indicators on the ground or other surfaces.

Additional details of examples of utility locator devices (also referred to herein for brevity as "locators" or "locator devices") and related devices and systems are described in various co-assigned patents and patent applications including U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. patent application Ser. No. 12/939,591, filed Nov. 4, 2010, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. patent application Ser. No. 14/022,067, filed Sep. 9, 2013, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. patent application Ser. No. 14/446,279, filed Jul. 29, 2014, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, entitled UTILITY LOCATING SYSTEMS, DEVICES, AND METHODS USING RADIO BROADCAST SIGNALS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Provisional Patent Application 62/295,502, filed Feb. 16, 2016, entitled BURIED UTILITY MARKER DEVICES, SYSTEMS, AND METHODS; U.S. Provisional Patent Application 62/307,365, filed Mar. 11, 2016, entitled UTILITY LOCATOR SUPPORT STRUCTURES; U.S. Provisional Patent Application 62/327,412, filed Apr. 25, 2016, entitled SYSTEMS AND METHODS FOR LOCATING AND/OR MAPPING BURIED UTILITIES USING VEHICLE MOUNTED LOCATING DEVICES; U.S. Pat. No. 9,341,740, issued May 17,2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; and U.S. Pat. No. 9,465,129, issued Oct. 11, 2016, entitled IMAGE-BASED MAPPING LOCATING SYSTEM. The content of each of the above-described applications is hereby incorporated by reference herein in its entirety. The above applications may be collectively denoted herein as the "co-assigned applications" or "incorporated applications."

For example, in accordance with various aspects of this disclosure, a trackable dipole attachment device may include a central body element and a retaining element for attaching the trackable dipole device to a paint stick or other marking device. The central body element may include a dipole signal transmitter which may be housed within. The signal transmitter may be actuated through actuation or control of the marking device and generate and broadcast one or more signals. One or more utility locator devices, as further described in the incorporated patents and patent applications listed previously herein, may receive the transmitted signal or signals and determine and map the position, including orientation, of each signal and thereby, each mark. The central body element may also include a variety of other sensors and other components. Such sensors and components may include, but are not limited to, Bluetooth radios and/or other wireless communication devices, cameras and/or other imaging sensors, audio sensors or recorders, gyroscopic sensors, accelerometers, other inertial sensors, and/or global positioning satellite (GPS) sensors or other satellite navigation sensors. The central body may further include a power element containing batteries or other powering components for providing electrical power to the signal transmitter and/or other components of the trackable dipole device. Data logging components may further be included within the central body of some trackable dipole devices. The retaining element may attach and secure the trackable dipole device to a paint stick or other marking device.

In accordance with one aspect, the trackable dipole device may be configured for use with any conventional or commercially available paint stick device. The trackable dipole device may further be configured or adapted for use on other types of marking devices such as whisker or flag dispensing marking devices or RFID or other electromagnetic marker devices.

In accordance with one aspect, a system for locating a buried object may include one or more utility locator devices and one or more paint sticks or like marking devices each with a trackable dipole device. The utility locator device may be used to determine locations of interest for applying marks. Upon determining a location of interest, the paint stick or other marking device may be used to apply the mark. Actuation of the marking device may further actuate or control the trackable dipole device causing one or more signals to be generated and broadcasted. The signal or signals may be received at the utility locator device. The utility locator device may determine the position, including orientation, of the trackable dipole device and track the device in three dimensional space based on the received signal or signals relative to the utility locator device. The utility locator device may further determine the relative position of each mark left on the ground's surface based on tracking position including location and orientation of the trackable dipole device.

In another aspect, the utility locator device of systems and methods herein may be configured to receive the signal or signals from a trackable dipole device while simultaneously receiving signals from other sources such as, but not limited to, buried utility lines, pipe sondes, and other system devices and determine the position of each signal. The utility locator device may be equipped with a dodecahedral or similar antenna array and associated components capable of tensor gradient measurements of received signals.

In another aspect, the present disclosure includes methods for determining the position, which includes orientation, of signals received at a utility locator from a trackable dipole device.

In another aspect, actuation or control of a trackable dipole device may be achieved through displacement of a paint canister nozzle. As the nozzle is displaced, causing paint to be dispensed from the paint canister, the trackable dipole device may also be actuated or otherwise controlled. When in the absence of a paint canister, the trigger or like mechanism for actuating the paint stick or other marking device may still actuate or control the trackable dipole device such that a virtual mark may be created in the absence of a physical mark.

In another aspect, the signal transmitter components of the trackable dipole device may be oriented such that the signal axis may approximately center about and align with an axis defined by the direction of marker material (e.g., paint spray) as it exits the marking device. Such signal transmitter components may include an antenna coil where the paint spray passes approximately through the center of the antenna coil. The antenna coil may further tilt to align its transmitted signal axis with the angle at which paint exits the paint canister within a paint stick device.

In another aspect, the antenna, antenna coils, and/or other transmitting element may be in various other orientations generating and broadcasting signal or signals of other orientations relative to the direction and orientation of the marker material as it exits the marking device.

In accordance with another aspect, the trackable dipole device accelerometers, compass sensors, gyroscopic sensors, and/or other like sensors may be included within a trackable dipole device in keeping with the present disclosure. Such sensors may be used to improve accuracy of position, including orientation, tracking.

In accordance with another aspect, the trackable dipole device may include a mounting device for using a smart phone, camera, or like device for recording various aspect of a locating operation where a mark has been created. Such recordings may include capturing images and/or audio correlating to a mark. Such mark correlated recording data may further be communicated with the trackable dipole device, utility locator, mapping systems, other computing systems including cloud based computing platforms, and/or other system devices. In some embodiments, GPS location and/or other system data collected by the smart phone or like device may be shared with such systems and devices.

In accordance with another aspect, the present disclosure may include methods and associated systems and devices for taking audio notes created by a user and further correlating such audio notes with marks, mark location, and/or images of the marks. Text-to-speech (TTS) type or similar translating methods may be used to translate audio files into virtual marks that may further be used in map systems containing utility information.

In accordance with another aspect, the present disclosure may include methods and associated systems and devices for collecting images of the locate and marking location and further correlating such images with the marks, mark locations, and/or locate data. The meaning of paint marks created in a system in keeping with the present disclosure may be translated through optical character recognition technology (OCR) or like methods to create virtual marks that may further be used in map systems containing utility information.

In accordance with another aspect, the present disclosure may include methods and associated systems and devices for tracking movements and orientations of the trackable dipole device and further correlating such data with the marks, mark locations, and/or locate data. Handwriting recognition or like methods for translating movement into written text may be applied to the tracked trackable dipole device movements to create virtual marks that may further be used in map systems containing utility information.

In another aspect, the present disclosure may include a method for verifying the accuracy of and flagging incorrectly placed marks in systems using a trackable dipole device.

In another aspect, the present disclosure may include a method for determining a refined mark location based on offset distance created from tilting of the trackable dipole device.

In accordance with another aspect of the present disclosure, the transmitting element of trackable dipole devices in keeping with the present disclosure may be built into an integrated marking device. Such integrated marking devices may be included or used in the various associated methods and systems in keeping with the present disclosure.

EXAMPLE EMBODIMENTS

Various additional aspects, features, and functions are described below in conjunction with the embodiments shown in FIG. 1A through FIG. 13 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Turning to FIG. 1A, a user 110 working with a utility locating and marking system embodiment 100 is shown. The locating and marking system may include a utility locator 140 and a paint marking stick 120, the paint stick having an elongate body with a proximal and distal end. The paint stick 120 may include a paint dispenser assembly including a paint canister 122 (or other paint storage reservoir or device) positioned at or near the distal end, and a trackable magnetic field dipole device 130 also disposed at or near the distal end to generate a dipole magnetic field signal for sensing by the utility locator 140 in conjunction with deployment of a paint mark from the paint canister 122. The paint canister 122 may dispense paint and create a paint mark on the surface of the ground (e.g., a roadway, sidewalk, or other surface), such as mark 132 as shown, when the user 110 triggers an actuator on the paint stick 120. In an exemplary embodiment the trackable dipole device 130 is removably attachable to the paint stick 120 (also denoted herein as a "trackable dipole attachment device") with a mechanical detachment/attachment mechanism; however, in some embodiments it may be integral with or attached to the paint stick so as to not be readily user-attachable or detachable.

Figure 5:
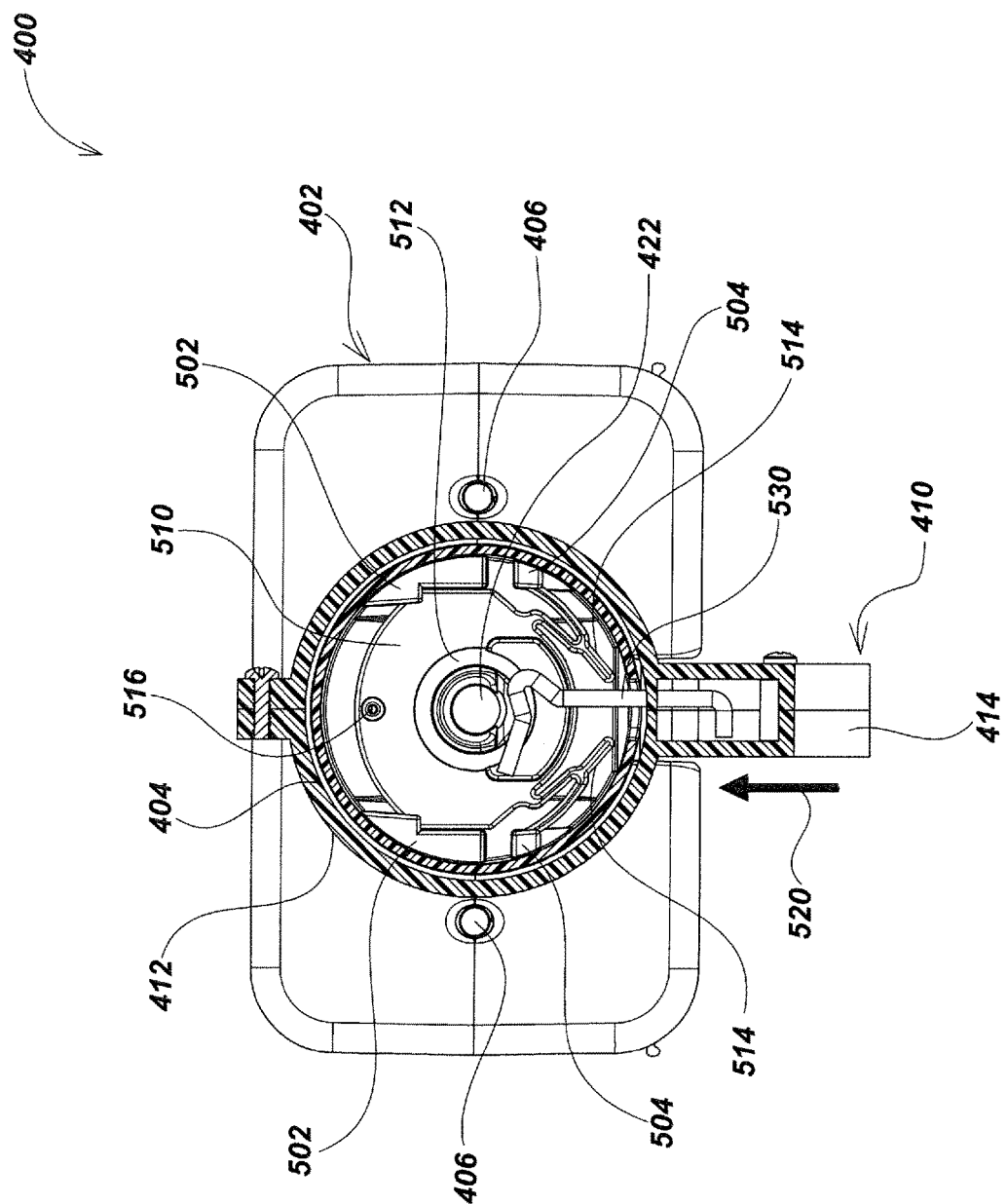
FIG. 5 is a section view of the trackable dipole device, paint stick device, and paint canister embodiments seen along line 5-5 of FIG. 4A.

The trackable dipole device 130 may be actuated or controlled by the actuator to generate and send an electromagnetic dipole field signal, such as magnetic dipole signal 134 as shown in FIG. 1A, in conjunction with deployment of paint spray from the paint canister 122. An actuation apparatus, such as an electronic circuitry operatively coupled to the actuator may be used to deploy paint (e.g. with the help of the actuation arm 530 as shown in FIG. 5) and control or actuate the trackable dipole device 130 to generate and send an electromagnetic signal 134 upon actuation. This magnetic field dipole signal may then be used to determine relative positional information of the dipole, and associated paint canister (and proximate paint mark), with respect to the locator (which may be enabled to determine its relative or absolute positional information, such as via a GPS or other positioning receiver, inertial navigation system, or other positioning system). This positional information may be combined to generate corresponding relative or absolute positional information associated with a paint marking on the ground or other surface.

For example, after transmission, signal 134 may be received at a utility locator, such as at antenna arrays (not shown in FIG. 1) of utility locator 140 as shown in FIG. 1, and may then be processed in electronic circuitry in the locator to determine the relative location and/or orientation of the trackable dipole device 130. If the utility locator includes absolute positional modules, such as GPS receivers, inertial navigation modules, and the like, absolute positional information for the trackable dipole device 130 may also be determined by combining the locator's absolute positional information with the relative positional information determined from the trackable dipole device 130. In some embodiments, the paint stick and/or trackable dipole device 130 may include absolute positional modules, such as inertial navigational modules, GPS receivers, and the like to determine and/or send its absolute positional information in addition to the electromagnetic dipole signal.

If the trackable dipole device 130 is moved during use and electromagnetic dipole signals 134 are sent during movement, the locator 140 may be programmed to track and store the trackable dipole device's 130 position, movements, and/or orientations over time and store this information in a non-transitory memory in or coupled to the locator. This information may further be associated with additional information such as data determined from the buried utility locator 140 using utility locator signal processing circuitry, relative or absolute positioning information, such as may be provided as an input to the locator using inertial sensors or satellite or terrestrial locating system modules (e.g., GPS receivers, GLONASS receivers, etc.).

In various system embodiments, the utility locator 140 may be any of a variety of utility locator devices known in the art for receiving magnetic field components of electromagnetic signals emitted from flowing AC current in a utility or electromagnetic sonde and determining information about the associated utility. For example, the utility locator 140 may detect a signal from a trackable dipole device 130 simultaneously with one or more signals from other sources (e.g., a buried utility line or other conductor, a pipe sonde, or other signal generating sources).

From these multiple sources, the utility locator 140 may then determine, in multi-dimensional space (typically in three-dimensional space), the position, which includes orientation, of each source. Examples of signal processing circuitry and implementation details for determining positional information from received magnetic field signals in a utility locator are described in the various co-assigned incorporated patents and patent applications. In an exemplary embodiment, the utility locator may include a dodecahedral antenna array or other similar antenna array configurations that provide multiple simultaneous signals usable to determine magnetic field tensor gradients associated with the sources. Examples are described in, for example, U.S. Pat. No. 9,207,350, issued Dec. 8, 2015, entitled BURIED OBJECT LOCATOR APPARATUS WITH SAFETY LIGHTING ARRAY, U.S. patent application Ser. No. 14/949,868, filed Nov. 23, 2015, entitled BURIED OBJECT LOCATOR APPARATUS AND SYSTEMS, as well as U.S. Provisional Patent Application 62/260,199, filed Nov. 25, 2015, entitled UTILITY LOCATING SYSTEMS, DEVICES, AND METHODS USING RADIO BROADCAST SIGNALS.

In these implementations, the utility locator may determine magnetic field tensor values associated with the magnetic fields provided from the trackable dipole device and optionally one or more buried utilities or other conductors, and store this information in a non-transitory memory for subsequent processing or transmission to a post-processing computing device or system.

Figure 3A:
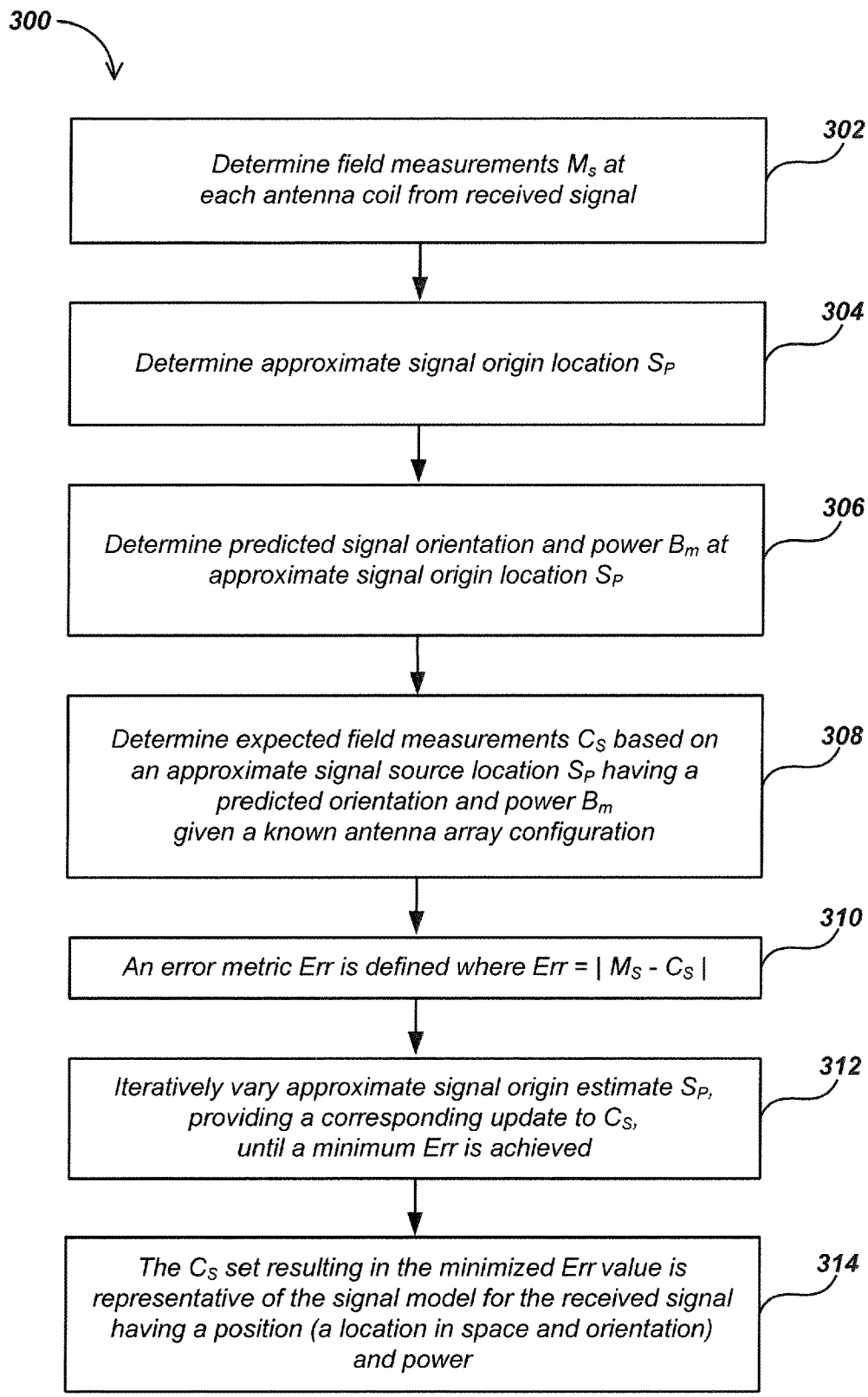
FIG. 3A is an embodiment of a method for determining a dipole signal's position and orientation in three dimensional space.

In some system embodiments, the utility locator 140 may determine positional information that includes a location and orientation of a received signal using method embodiment 300 as described in FIG. 3A. For example, as shown in FIG. 3A, at step 302, field measurements of a received signal, which may be or may include voltage measurements, gradient tensor measurements, gradient vectors, b-field vectors and the like, may be made from received signals at each antenna coil of the locator antenna array(s). In an exemplary embodiment the antenna array(s) include a dodecahedral antenna array which may include twelve coils mounted in a dodecahedral shape on a corresponding dodecahedral frame. This set of measurements is notated herein as $M_s$. In step 304, an approximate signal origin location estimate in three dimensional space, notated herein as $S_p$, may be determined using measurement set $M_s$ from step 302.

In some method embodiments, $M_s$ values may be fit into or be used to determine values for a lookup table providing the approximate signal origin location, $S_p$. The lookup table may, for instance, be derived from inverse trigonometric relationships between measured b-field vectors with gradient vectors. In some embodiments, the angle between the magnetic field and the gradient of the magnitude may be calculated from measurement set $M_s$ values. The resultant angle may be used with a lookup table to determine a magnetic latitude descriptive of the signal's source position relative to the utility locator. In other embodiments, rather than a lookup table, an approximate origin location estimate $S_p$ may be calculated in step 304. For example, $S_p$ may be calculated from the inverse trigonometric relationship between measured b-field vectors with gradient vectors.

In step 306, a predicted signal source orientation and power, notated herein as $B_m$, may be determined based on approximate origin location $S_p$, at step 304, and b-field values may be determined from signals at one or more antenna arrays. For instance, b-field values may be b-field measurements from a tri-axial antenna array or b-field estimates from a dodecahedral antenna array given an origin location $S_p$. In step 308, a set of expected field measurements defined as $C_s$ may be determined from the magnetic field model of a dipole signal at approximate signal source location $S_p$ having a predicted orientation and power $B_m$ given a known antenna array configuration, such as a dodecahedral antenna array. In step 310, an error metric Err may be determined, where $$Err=M_s-C_s.$$

In step 312, the approximate signal origin estimate $S_p$ may be iteratively varied, providing a corresponding update to $C_s$, until a minimum Err is achieved. In step 314, the $C_s$ set resulting in the minimized Err value may be determined, representative of the signal model for the received signal having a position (a location in space and orientation) and power.

In alternate method embodiments for determining the position of a received signal that includes a location and orientation, orientation may be determined through accelerometers, magnetometers, gyroscopic sensors, and/or other similar sensor types. Such method embodiments may be used in, for example, utility locators with antennas or antenna arrays that are unable to calculate gradient tensors or where gradient tensor calculations are not used for signal processing. Such methods may be used to determine the origin location of the received signal or signals using, for instance, steps 302 and 304 of method 300 described in FIG. 3A. Orientation information, determined through accelerometers, magnetometers, gyroscopic, and/or like sensors within the trackable dipole device and/or marking device, may further be communicated to the utility locator, for instance, through Bluetooth or other wireless communications or wired communications. Such methods, including method 300 of FIG. 3A, may be done in real-time or in post processing at the utility locator 140 or other system device.

Referring back to FIG. 1A, the utility locator 140 may determine position and orientation of the trackable dipole attachment device 130 when paint or other marks are deployed, allowing the placement of paint marks, such as mark 132, to be determined at the utility locator 140 or other computing device in either real time or in post processing. In an exemplary locate operation, one or more marks 132 may be placed on the ground, with the marks corresponding to the detection of a buried asset such as utility line 150 in the locator 140.

For example as shown in FIG. 1A, a signal emitted from utility line 150, such as signal 152 (e.g., a cylindrical magnetic field signal about the conductive utility 150 caused by current flowing in utility 150) may be received and processed simultaneously at the utility locator 140 with signal 134 (a dipole magnetic field signal from trackable dipole device 130) and be used to determine the location, orientation, and depth of utility line 150 within the ground as well as the position of the trackable dipole device (and associated paint stick).

Signal 152 may be a passive signal caused by, for example, current flow induced in the utility from broadcast signals such as AM broadcast radio transmissions or other ambient signals, or may be an active signal caused by currents intentionally induced onto the line through the use of a transmitter device (not illustrated). Examples of such transmitter devices are described in the incorporated applications. Some utilities may also have inherent current flow therein (and corresponding radiated electromagnetic fields), such as buried power lines or other electrical power or signal sources.

In system 100 of FIG. 1A, user 110 is shown carrying utility locator 140 as the locate operation is performed. In some embodiments, such as in system 102 of FIG. 1B and system 104 of FIG. 1C, the utility locator 140 may be self-standing and may be kept stationary while the user 110 moves about during the locate operation. In either configuration, the utility locator 140 may determine the precise location of the trackable dipole attachment device 130 from the associated signal 134, along with determining the location of buried utility 150 from its radiated signal 152.

In some embodiments, such as those where the utility locator 140 is self-standing away from the user 110, the user may be steered toward proper mark placement based on information about the determined location of buried assets, such as utility line 150, that are communicated from the utility locator 140 to the user 110. For example, the utility locator 140 may be programmed to communicate such information to a smart phone or similar device that is held or viewable by the user 110. In some embodiments, a trackable dipole device may be configured to provide audio indicators corresponding to position information, or have LEDs or other visual indicators to provide utility location information.

Figure 3B:
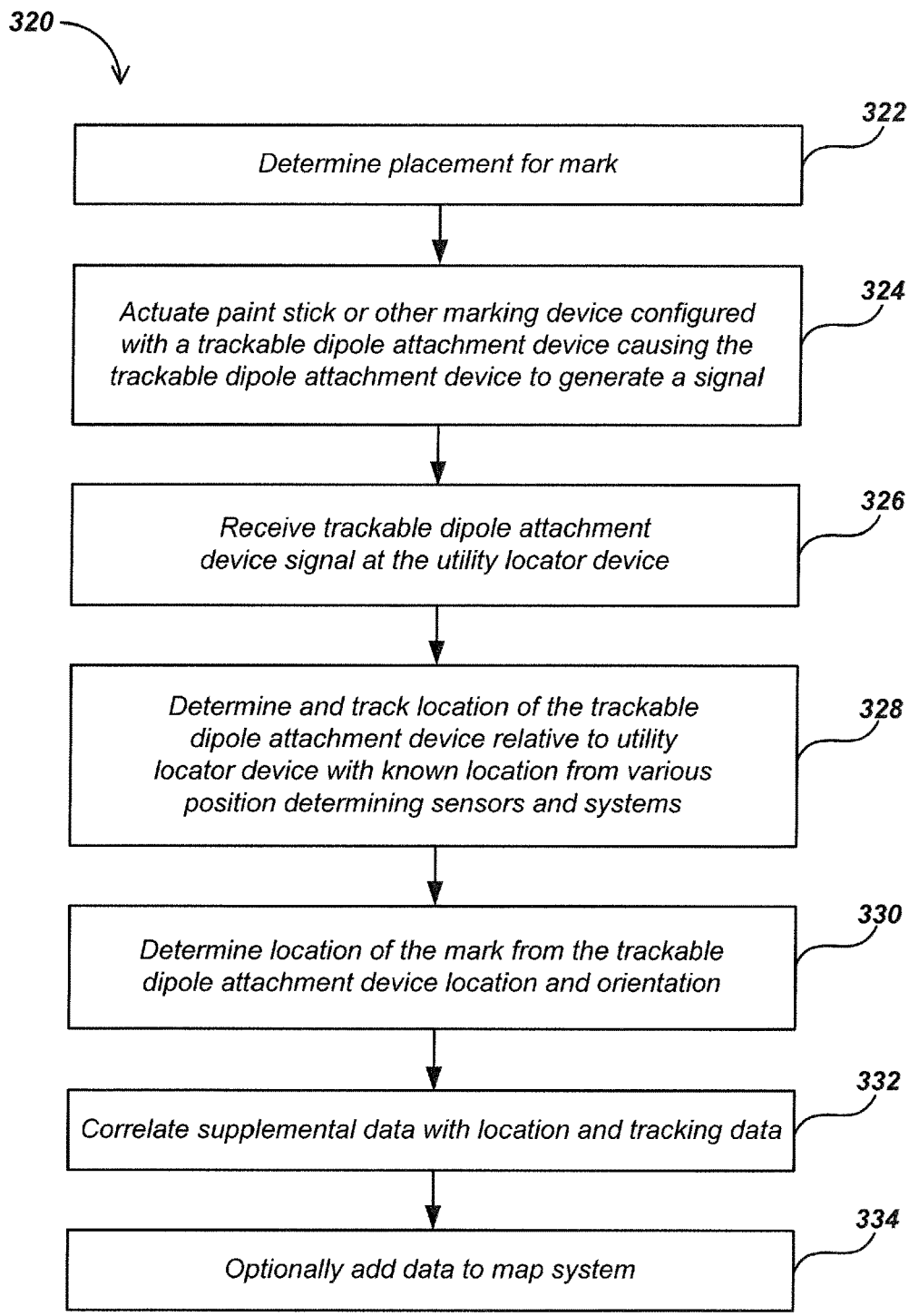
FIG. 3B is an embodiment of a method for using a utility locating and marking system.

Turning to FIG. 3B, an embodiment of a method 320 for locating and marking a buried utility or other asset with a paint stick including a trackable dipole device, such as device 130, in conjunction with a utility locator, such as locator 140, is illustrated.

A first step 322 of method 320 may include determining the location for a potential mark placement. The location may correspond to the location of a buried utility or other asset at the ground surface. The utility may be detected with a utility locator, such as the utility locator 140 of FIGS. 1A-1C, based on a signal emitted from the utility, such as signal 152 of FIGS. 1A-1C. In some applications, the location of buried assets may come from historic data. For example, the location of buried assets may have been determined in a prior locate operation and then stored and later provided via a device such as a smart phone or tablet to the user in the field. Maps, spreadsheets, or other forms of utility data may also be used to aid in identifying a target utility.

In step 324, a user may operate a paint stick actuator or other marking device actuation element. When the marking device includes a trackable dipole device such as described herein, a paint mark may be put on the ground or other surface. The actuation of the marking device in step 324 may further actuate or control the trackable dipole attachment device so that it generates and broadcasts a dipole magnetic field signal for detection by the locator.

In other embodiments, the trackable dipole device may periodically or continuously transmit the dipole signal. In some such embodiments, actuation of the marking device in step 324 may trigger a modulation or other change in the dipole signal. This additional information may be processed in the locator and may be used to indicate creation of the mark to the locator user or as stored data in a memory.

In step 326, the dipole magnetic field signal may be received at the utility locator using a magnetic field antenna. The signal may then be processed with signal processing circuitry in the locator. The utility locator may continuously receive and track the signal from the trackable dipole device as the mark is being created in some embodiments.

In step 328, the utility locator may process the dipole magnetic field signal to determine the location of and/or track the movements of position (location and orientation) of the trackable dipole device.

In step 330, data indicative of the placement of the mark of the ground surface may be determined in the locator from position information determined from signals sent from the trackable dipole device in step 328. For example, the mark location along the ground surface may be offset from the trackable dipole device due to tilting of the marking device when applying the mark. This offset may be accounted for based on the orientation of the trackable dipole device as determined in step 328. Step 330 may, for example, use method 1000 described in FIG. 10 or some other similar or equivalent method. In some embodiments, the determined location of the trackable dipole device and the mark may be considered to be the same location.

In an optional step 332, supplemental data may be correlated with location and tracking data previously determined in method 320. Such supplemental data may include images of the mark or locate area, user input including voice commands, virtual marks and/or data relating to translating of marks as described herein, and/or other system device data. In another optional step 334, location and tracking data and correlated supplemental data may be included in a map or mapping system covering the locate area.

In some embodiments, locating systems and methods and devices thereof using a trackable dipole device may be programmed in electronic circuitry to translate or otherwise interpret a predefined meaning of marks, resulting in a virtual mark that may be included in the supplemental data disclosed in step 332 of method 320. Such meanings may be derived through various inputs using various associated devices or sensors. Such virtual marks may further be added to map data associated with the locate operation area.

In some such systems, imagery or optical sensor data of the mark may be used to interpret mark meaning. For example, as illustrated in FIG. 1A, the utility locator 140 may include an optical ground tracking device 160, which may collect one or more images of the locate operation. The optical ground tracking device 160 may be an imaging sensor or camera module as described in certain of the incorporated optical ground tracking patents and patent applications.

Images collected by optical ground tracking device 160 may include data associated with mark 132 and/or other marks made by paint stick 120. The images of marks, including mark 132, may be translated through optical character recognition (OCR) or other like methods. For instance, mark 132 may include the term "gas" painted on the ground's surface. Through OCR or other text or graphical recognition methods, the written term may be recognized and translated to understand that the mark is indicating the location of a gas line. The recognition and translation of marks may be extended to include commonly used abbreviations, color coding, and/or other such common markings used in the locating industry and for marking operations. For example, a line of a certain color painted at the ground surface may indicate the location of a particular utility type buried beneath. Such images may be translated to represent that the colored line indicates a type of utility and its location and orientation within coordinates of the Earth and/or at a corresponding absolute or relative location along the ground surface.

Figure 1B:
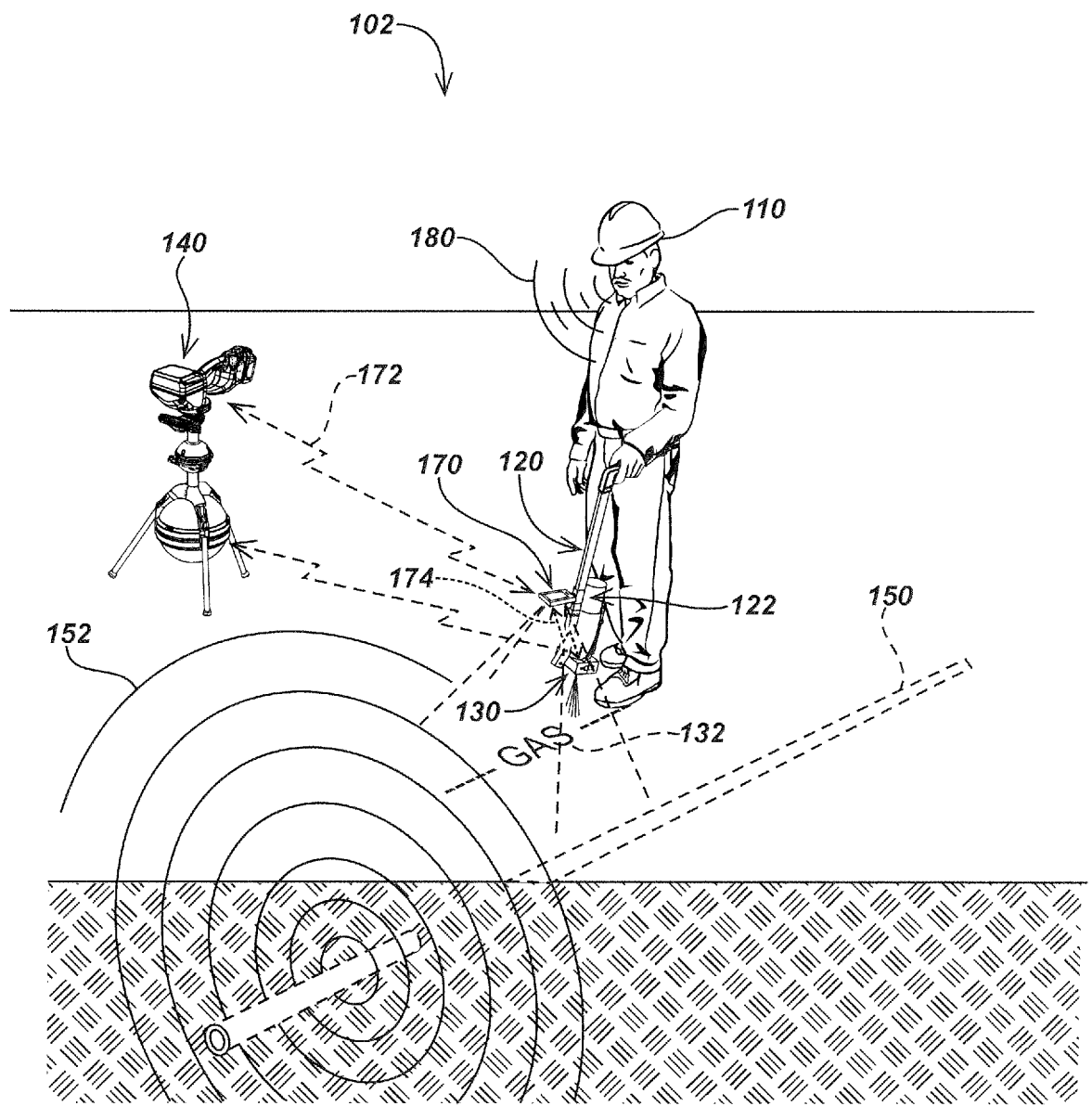
FIG. 1B is an illustration of another utility locating and marking system embodiment.

In further embodiments, imaging sensors may be included in a trackable dipole device directly, within a paint stick, or in other system devices including a recording device retainer accessory 170 illustrated in FIG. 1B for collecting images and/or other recordable input of placed marks. The system 102 of FIG. 1B may share features of system 100 of FIG. 1A with the addition of recording device retainer accessory 170 secured along the mast of paint stick 120.

The recording device retainer accessory 170 may include a smart phone (such as the smart phone 206 illustrated in FIGS. 2A and 2B) to collect images and/or other recordable input of mark 132 created by paint stick 120. The images of marks, such as mark 132, may be translated through optical character recognition (OCR) or other like methods. The smart phone 206 (FIGS. 2A and 2B) or other like device housed within recording device retainer accessory 170, as well as the trackable dipole device 130 and utility locator 140, may be programmed to communicate information, which may be communicated wirelessly through one or more different wireless communication methods and devices (e.g., Bluetooth radio, WIFI, ISM, or the like).

For example, a Bluetooth connection 172 may be established between utility locator 140 and smart phone 206 (FIGS. 2A and 2B) or like device within recording device retainer accessory 170. In some embodiments, connection 172 may, for instance, be used to steer the paint stick to the appropriate location for creating a mark. Another connection 174, which may be a low power Bluetooth connection, may be established between the trackable dipole device 130 and smart phone 206 (FIGS. 2A and 2B) or like device within recording device retainer accessory 170. Connection 174 may, as discussed subsequently with method 340 of FIG. 3C, be used to initiate recording of images and/or other recordable input.

Additional data connections may be made between various other system devices including the trackable dipole device 130 and the utility locator 140. Through the various data connections (e.g., connections 172 and/or 174), locate information and related data may be shared between the various system 102 devices. Furthermore, a smart phone (such as smart phone 206 illustrated in FIGS. 2A and 2B) or other like device with internet connectivity housed within the recording device retainer accessory 170 may allow locate data and other shared information between system devices to further be uploaded to remote computing devices, cloud storage, and/or other connected system devices. Such data may include, but is not limited to, GPS locations or other geospatial descriptions, images, user input such as audio notes, utility line locations and descriptions, map information, and so on.

The various devices of system 102 may further record audio, such as the voice note 180 provided by user 110. The utility locator 140, smart phone 206 (FIGS. 2A and 2B) or other like device housed within recording device retainer accessory 170, and/or trackable dipole device 130 may include a microphone and associated memory and/or other components required to collect and store audio, such as voice note 180, and further translate the collected and stored audio files using speech recognition (SR) or similar methods. For instance, user 110 may, while creating a mark 132, say the word "gas." This voice note 180 may be recorded by one or more devices within system 102. Speech recognition or like methods may be use to translate the spoken "gas" voice note 180 and determine that the create mark relates to a gas line. Furthermore, tracking positions including locations and orientations of the trackable dipole attachment device and further correlating such data with the marks, mark locations, and/or other locate data may be used to determine a mark's meaning. Handwriting recognition or like methods for translating tracked movements and orientations of the trackable dipole device 130 may be used to create virtual marks that may further be used in map systems containing utility information.

Figure 2A:
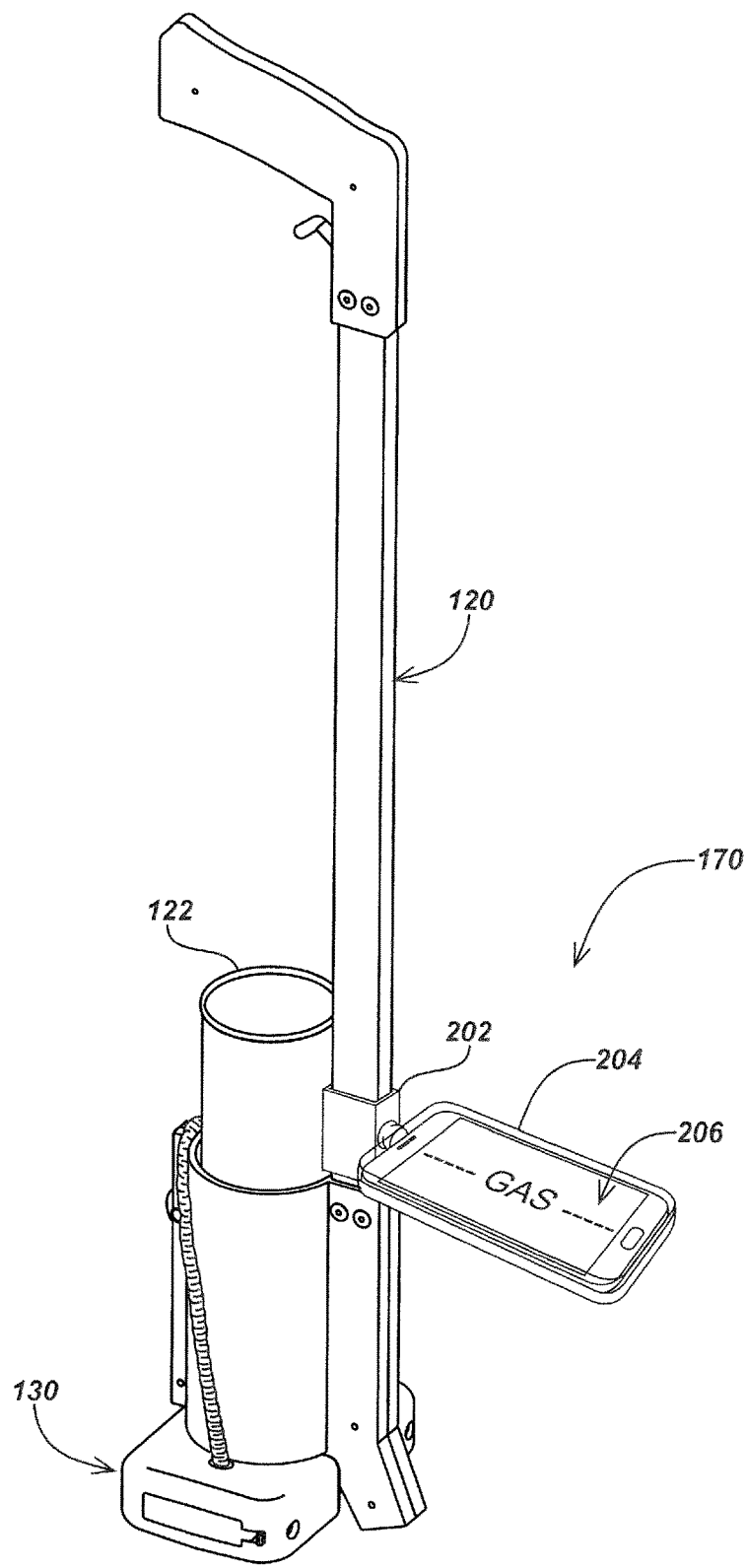
FIG. 2A is an illustration of a paint stick embodiment equipped with a recording device retainer accessory.
Figure 2B:
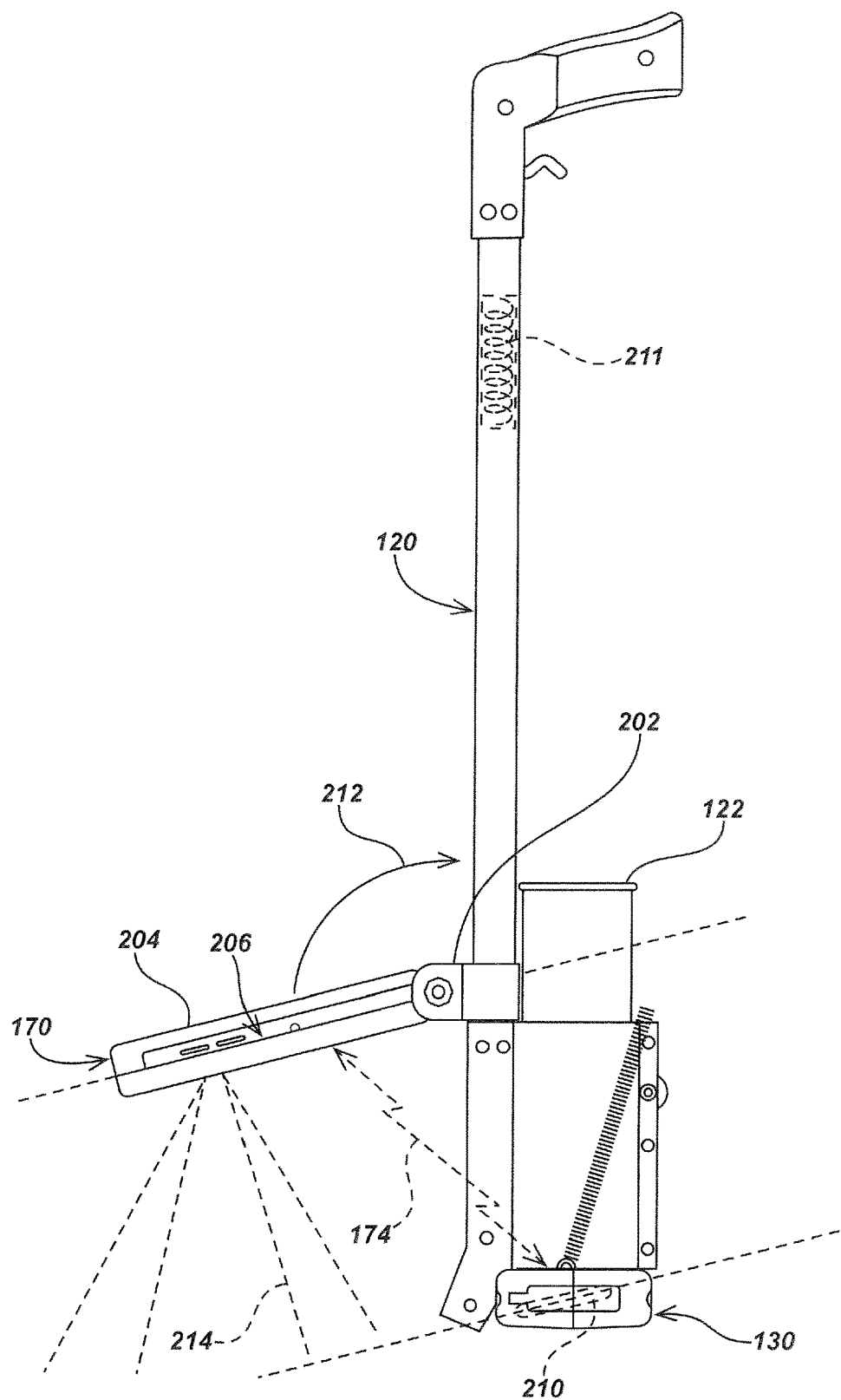
FIG. 2B is a side view of the paint stick embodiment of FIG. 2A.

As further illustrated in FIGS. 2A and 2B, the recording device retainer accessory 170 may include a mounting piece 202 for securing a housing piece 204 to the mast of a paint stick 120 or other marking device. The housing piece 204 may allow a smart phone 206 or other like device to collect images and other recordable input of the locate operation while protecting the smart phone 206 or other like device housed within from the external environment.

As best illustrated in FIG. 2B, the recording device retainer accessory 170 may hold a smart phone 206 at an angle that allows the smart phone 206 to collect images of a created mark. For instance, the angle at which the recording device retainer accessory 170 holds the smart phone 206 may be parallel to the antenna coil 210 within the trackable dipole device 130. Further, the tilt of antenna coil 210 may be set to align the axis of the transmitted signal therefrom with the directional axis of paint as it exits paint canister 122. When not in use, the recording device retainer accessory 170 may be foldable inward along direction 212 to sit along the mast of paint stick 120. When deployed for use, the recording device retainer accessory 170 may be positioned such that the field of view 214 of image sensors within smart phone 206 are at least partially unobstructed to provide a view of marks created. In addition to the antenna coil 210, one or more additional antenna coils (e.g., antenna coil 211) or dipole tracking sondes/beacons may be provided in or coupled to the paint stick 120 to improve accuracy of the paint stick's position calculation or tracking.

Figure 2C:
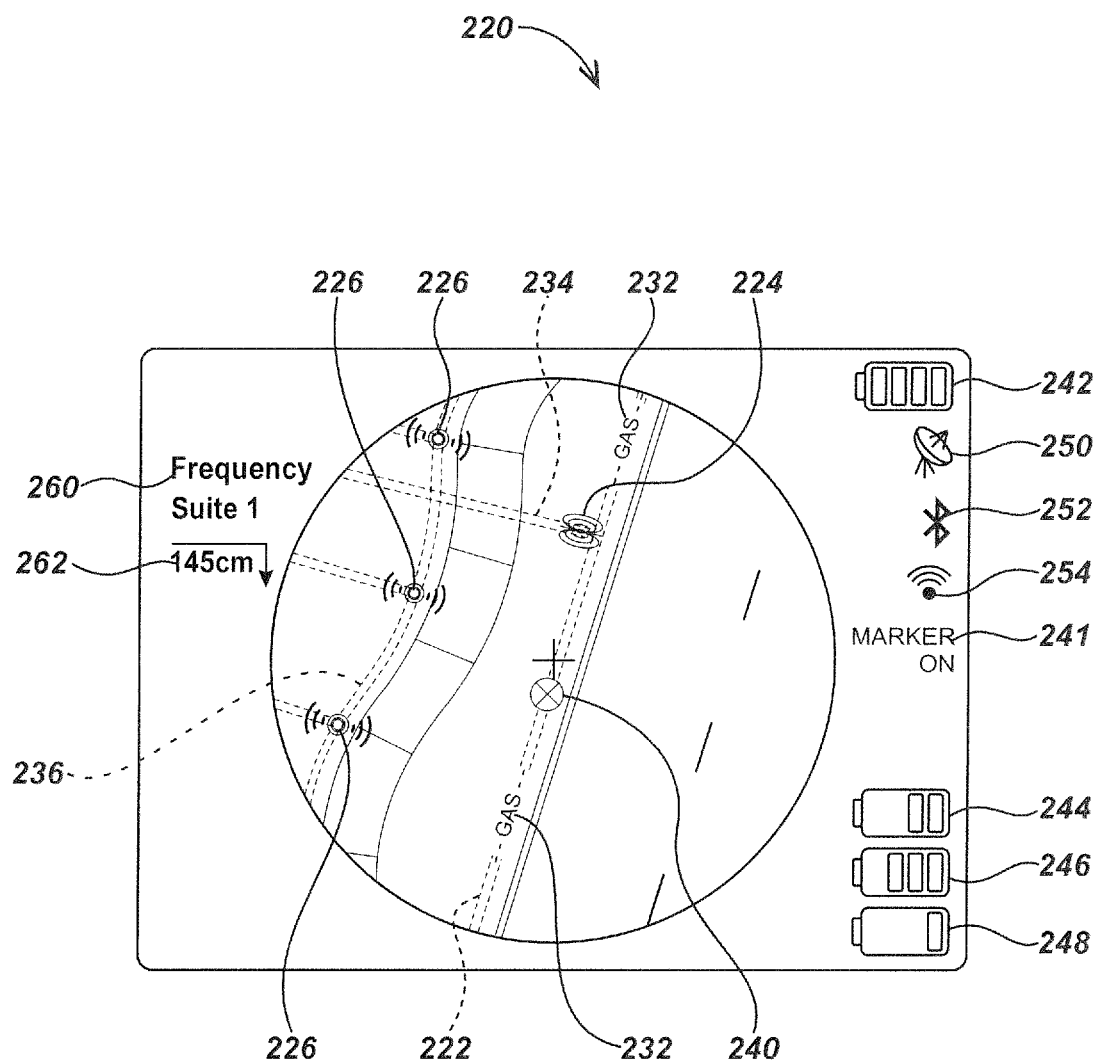
FIG. 2C is a locator display embodiment showing signals from multiple sources received and displayed simultaneously.

Utility locators may be configured to receive signals from multiple sources simultaneously and determine the location of each from the received signals. As illustrated in FIG. 2C, a utility locator display 220 may display the location and corresponding data of various signal transmitting devices simultaneously. For instance, the utility locator display 220 may receive signals from a utility line 222, a pipe sonde 224, and a series of electronic marker devices 226, and determine their locations and other locate details therefrom.

In other embodiments, the utility locator may receive and display information based on signals from various different devices in different quantities and locations. Within utility locator display 220, a series of paint markings 232, which may be both a physical and virtual mark, may correspond to the location of utility line 222. As a paint stick with a trackable device is actuated and dispenses paint, an on-screen marker icon 240 and/or marker indicator 241 may appear on utility locator display 220. The utility locator may further receive signals from other devices, such a pipe sonde 224, and may display its location and the location, depth, and orientation of a corresponding utility line 234.

The utility locator may further receive signals from a series of electronic marker devices 226. The location of one or more electronic marker devices 226 received at a utility locator may be used to access historic or other database information regarding the asset marked. For instance, non-conductive pipes 236 (e.g. PVC irrigation pipes) may be marked by electronic marker devices 226 as they are typically difficult to trace unless an associated conductor tracer wire is buried therewith. Determining the presence of an electronic marker device such as electronic marker devices 226 at a known location may including receiving information that may include position and depths of pipes 236 (either directly from the marker device via communicated data or indirectly through reference data determined at the time the device was installed with the utility).

Display 220 may further provide various system, device, and locate information. For instance, display 220 may include a utility locator battery power indicator 242 as well as battery power indicators 244, 246, and 248 displaying remaining battery power for connected system devices. Other indicators on display 220 may indicate GPS lock 250, Bluetooth connectivity 252, WIFI connectivity 254, and the like. Other information on utility locator display 220 may include, but is not limited to, frequency or frequency suite 260 currently being used, depth indicator 262 of one or more utility lines or other signal emitting devices within the ground, and the like.

Figure 2D:
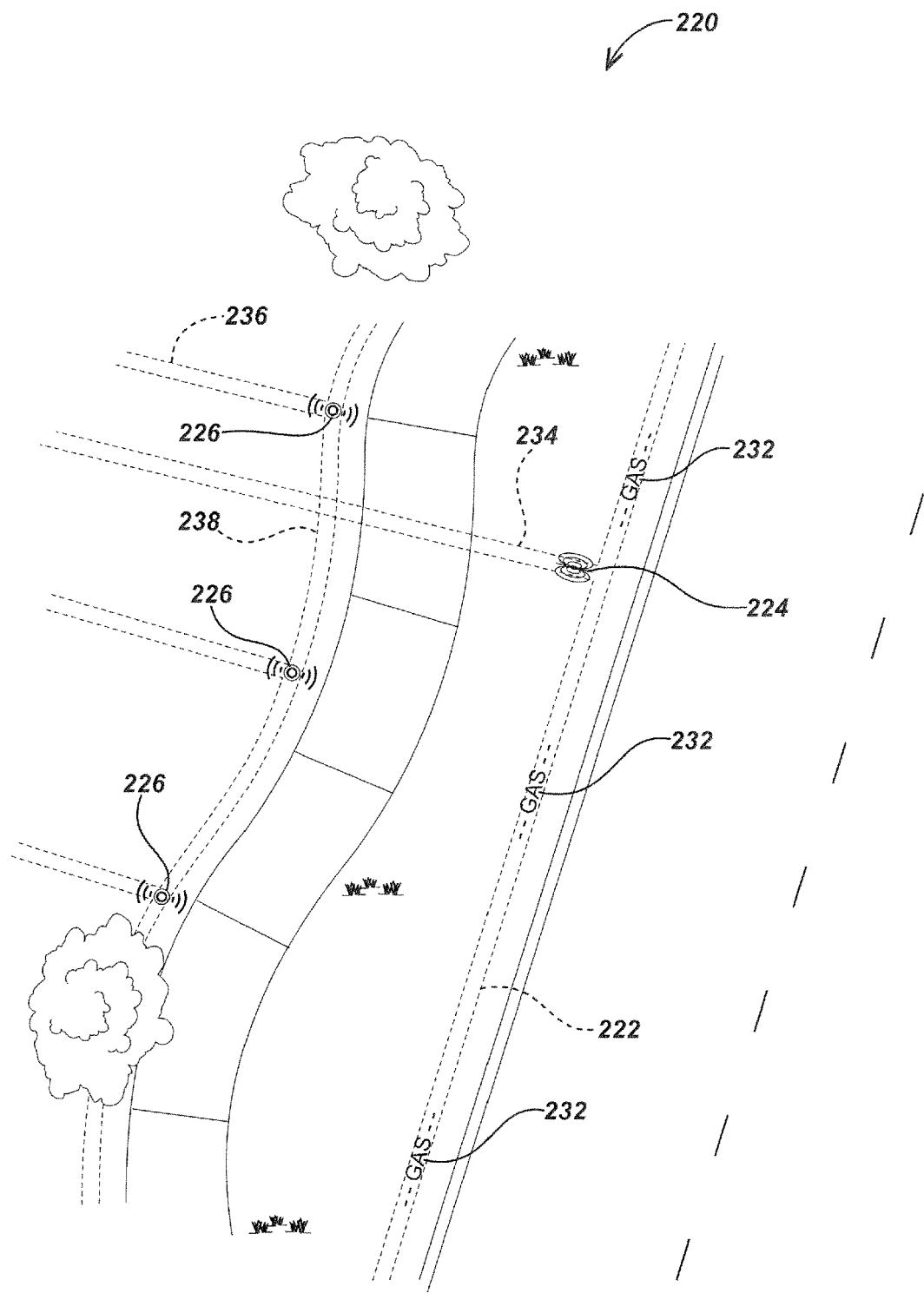
FIG. 2D is a locating map embodiment based on information received at the utility locator of FIG. 2C.

The signal information and other locate details determined at the utility locator, as well as historic locate data, may be included within a map or maps, which may be electronic or computerized maps, of the locate area. As illustrated in FIG. 2D, a locate map 220 may incorporate information regarding the buried utilities and/or other assets as collected by the utility locator demonstrated in FIG. 2C. The locate map 220 may be a computerized map displayed upon a tablet, smart phone, utility locator, and/or other computer device. For instance, locate map 220 may include utility line 222 with corresponding paint markings 232, pipe sonde 224 with corresponding utility line 234, and electronic marker devices 226 with corresponding historic data of non-conductive pipes 236.

The locate map 220 may further include the various locate details such as, but not limited to, depths of utilities and/or associated markings or markers, serial numbers of detected signal transmitting devices and/or other locate system devices, and/or internal images of pipes or other conduits gathered by pipe inspection cameras. Such locate details may be either determined by the utility locator or other system device and/or historic data accessed by the map or mapping system. The locate map 220 may include one or more images of the locate operation which may be or include orthorectified images collected by the utility locator fit to pre-existing maps or aerial images of the locate area. Other signal transmitting device and/or other system device information may further be included on a locate map such as locate map 220. For instance, such systems may include horizontal drilling devices and systems that may include dipole transmitters secured thereto to track locations and movements as it bores through the ground. Such systems may include inspections for viewing within pipes or other conduits that may be trackable by a utility locator. A locate map embodiment may further incorporate such images and allow a user to transition to view the interior of the inspected pipe or conduit.

Figure 3C:
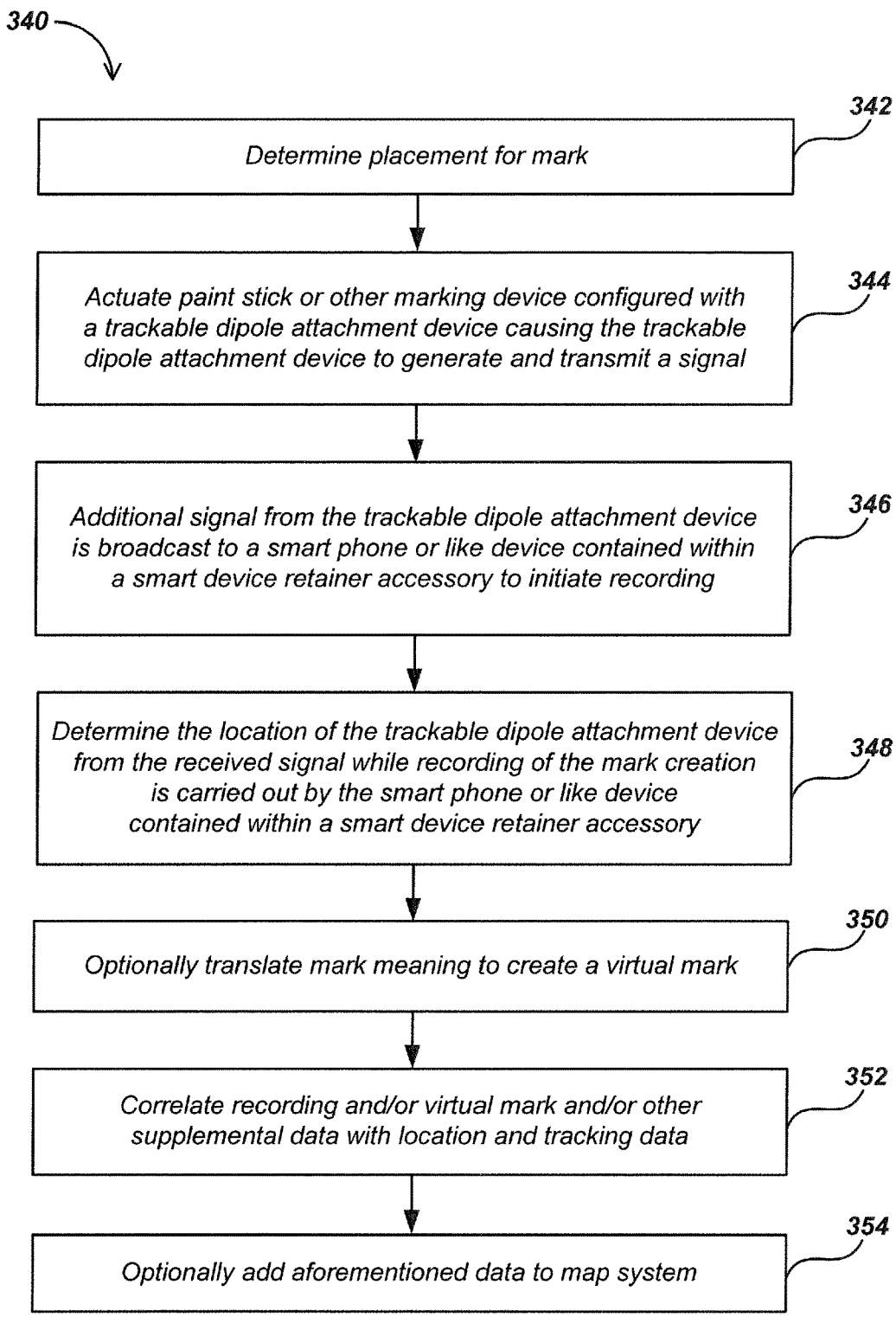
FIG. 3C is an embodiment of another method for using a utility locating and marking system for translating recorded marks.

As illustrated in FIG. 3C, a method embodiment 340 for use in a locating system including a trackable dipole attachment device and recording device retainer accessory, such as system 102 of FIG. 1B, is described. Step 342 may include determining the location for the placement of a potential mark with a paint stick. This may be done using a utility locator device, such as the utility locator 140 of FIG. 1B. The utility location may be determined using a signal such as signal 152 of FIG. 1B that is emitted from a buried utility. In some uses, the location of buried assets may come from historic data. For example, the location of buried assets may be determined in a prior locate operation and such data may be accessible on the utility locator's screen, a smart phone, or other computing or system device available to the user.

In step 344, a user may actuate a control on a paint stick or other marking device equipped with or including a trackable dipole device as described herein to create a mark indicating the buried asset located from step 342. The actuation of the marking device in step 344 may further simultaneously actuate or control operation of the attached trackable dipole device so that it may generate and send a corresponding electromagnetic signal.

In other embodiments, the trackable dipole device may transmit a continuous wave (CW) signal, and actuation of the marking device within step 344 may create a modulation or other parameter change in the signal indicating to the utility locator that a mark is being created.

In step 346, an additional signal, which may be a Bluetooth signal or other wireless signal, may be transmitted from the trackable dipole device to the smart phone or like device within the recording device retainer accessory, commanding the phone or other device to initiate a recording. Such recordings may include the collection of images of the created mark and/or audio recordings (e.g., voice note 180 of FIG. 1B). In step 348, the dipole signal from step 344 may be received at the utility locator and the signal from step 346 may be received at the device contained within the recording device retainer accessory.

In step 350, the smart phone or like device within the recording device retainer accessory may record (e.g., images and or audio recordings) while the utility locator tracks the positions including locations and orientations of the trackable dipole device. The recordings may be translated (e.g., through OCR, SR, TTS, Handwriting recognition, or similar translating method) to create a virtual mark. In step 352, the location of the mark placement on the ground surface may be determined and correlated to recording taken simultaneously. In step 354, locate information, recorded mark location, and translated virtual mark information may be included in a map or mapping system covering the locate area.

Figure 3D:
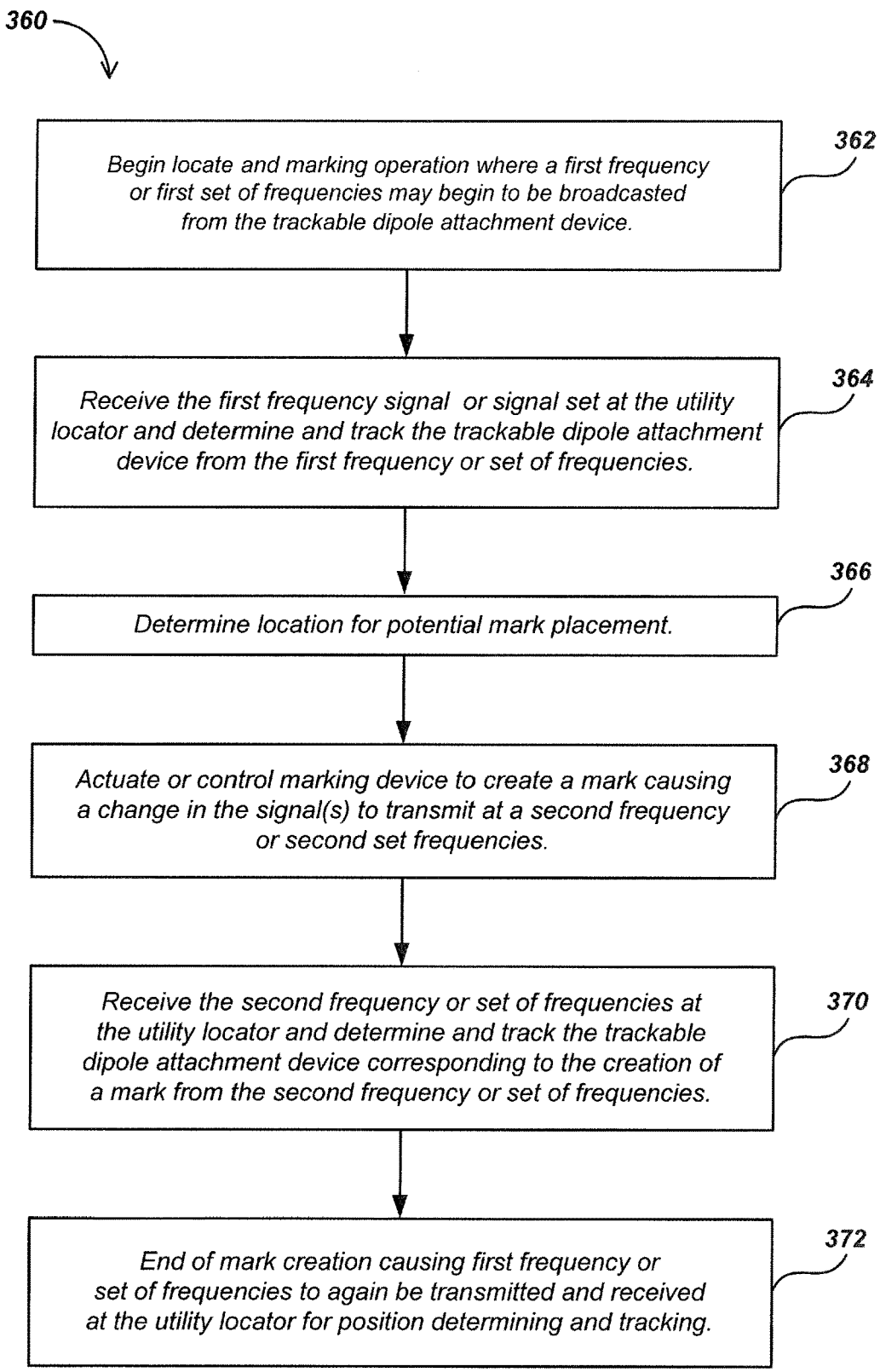
FIG. 3D is an embodiment of a method for using a trackable dipole device embodiment that transmits signals throughout the locate and marking operation.

As briefly described in step 324 in the method 320 and 344 in method 340, some trackable dipole device embodiments may transmit one or more signals throughout the locate and marking operation. Within such embodiments, actuation of the marking device may generate a change in the signal or signals, indicating the creation of a mark within the utility locator. As shown in FIG. 3D, method embodiment 360 illustrates details of use of a trackable dipole device embodiment where signals are transmitted throughout the locate and marking operation. The transmitter signal may be in a continuous wave (CW) signaling format when no marks are being deployed. In step 362, a user may indicate the beginning of the locate and marking operation. This may trigger the trackable dipole device to begin broadcasting at a first frequency or first set of frequencies in a CW fashion in an exemplary embodiment.

For example, pulling a trigger or other actuation mechanism of a paint stick at the beginning of an operation to test the spray may trigger an associated trackable dipole device that the operation has begun and to start transmitting at the first frequency or set of frequencies. In some method embodiments, the first frequency or set of frequencies may, for instance, be of lower power level than subsequent output signals. In step 364, the first frequency or set of frequencies may be received at one or more utility locators that are programmed to determine and track the position, including orientation, of the trackable dipole device therefrom.

Position determining and tracking in step 364 may be implemented through method embodiment 300 described in FIG. 3A or other like methods, such as those described in various incorporated patents and patent applications. In step 366, a location for a potential mark placement may be determined. For instance, the same utility locator receiving the signal or signals from the trackable dipole device may simultaneously receive one or more signals from one or more buried utility lines and may determine their location, orientation, and depth within the ground using techniques as described in the incorporated applications and/or as known or developed in the art.

A user may then walk the locate and marking operation site and determine locations for mark placement based on the location and other information determined from signals emitted from the buried utilities or other assets as determined in the utility locator. In step 368, upon determining a mark placement location, a user may actuate the marking device to create a paint mark, such as by depressing a paint stick handle or trigger mechanism. The triggering of a mark placement may also be used to control operation of the trackable dipole device. For example, initiation of paint deployment may signal the dipole device to end the broadcasting of the first frequency or set of frequencies and begin broadcasting a second frequency or set of frequencies. Other signal changes, such as changes in amplitude, frequency, phase, modulation, or other signal characteristics may also be used to indicate start and/or stop of paint deployment.

The user may again pull the trigger of a paint stick to create a spray of paint on the ground. This second pull (and subsequent pulls thereafter) may indicate to the trackable dipole device to cease broadcasting of the first frequency or set of frequencies and begin broadcasting a second frequency or set of frequencies. In some method embodiments, the second frequency or set of frequencies may be at a higher signal power level than the first frequency or set of frequencies.

In step 370, the utility locator may receive the second frequency or set of frequencies and locate and track the trackable dipole device corresponding to the creation of a mark from the second frequency or set of frequencies. In step 372, upon finishing creating the mark, the trackable dipole device may again switch back to the first frequency or set of frequencies. These may be received at the utility locator, indicating no mark is currently being created. For example, the user may release the trigger on a paint stick after spraying a paint mark causing the switch back from the second frequency or set of frequencies to the first frequency or set of frequencies at the trackable dipole device.

Method 360 may repeat from step 366 at each potential mark placement throughout the locate and marking operation. Upon completion, the trackable dipole device may be powered off to conserve battery life or may power off after a certain time has passed with no detected movements or actions. In alternate methods, the trackable dipole device may broadcast a single frequency for position determining purposes. In such embodiments, a separate signal, for instance a Bluetooth signal, may be transmitted from the trackable dipole device when a trigger has been pulled to communicate to a utility locator when a mark is being created. In further embodiments, other signal modulation techniques and/or like communication methods may be used to indicate to a utility locator when a mark is being created. For example, signals may be modulated in amplitude, frequency, phase, or other parameters to indicate marking paint application and/or termination of application or other paint stick operations.

Figure 3E:
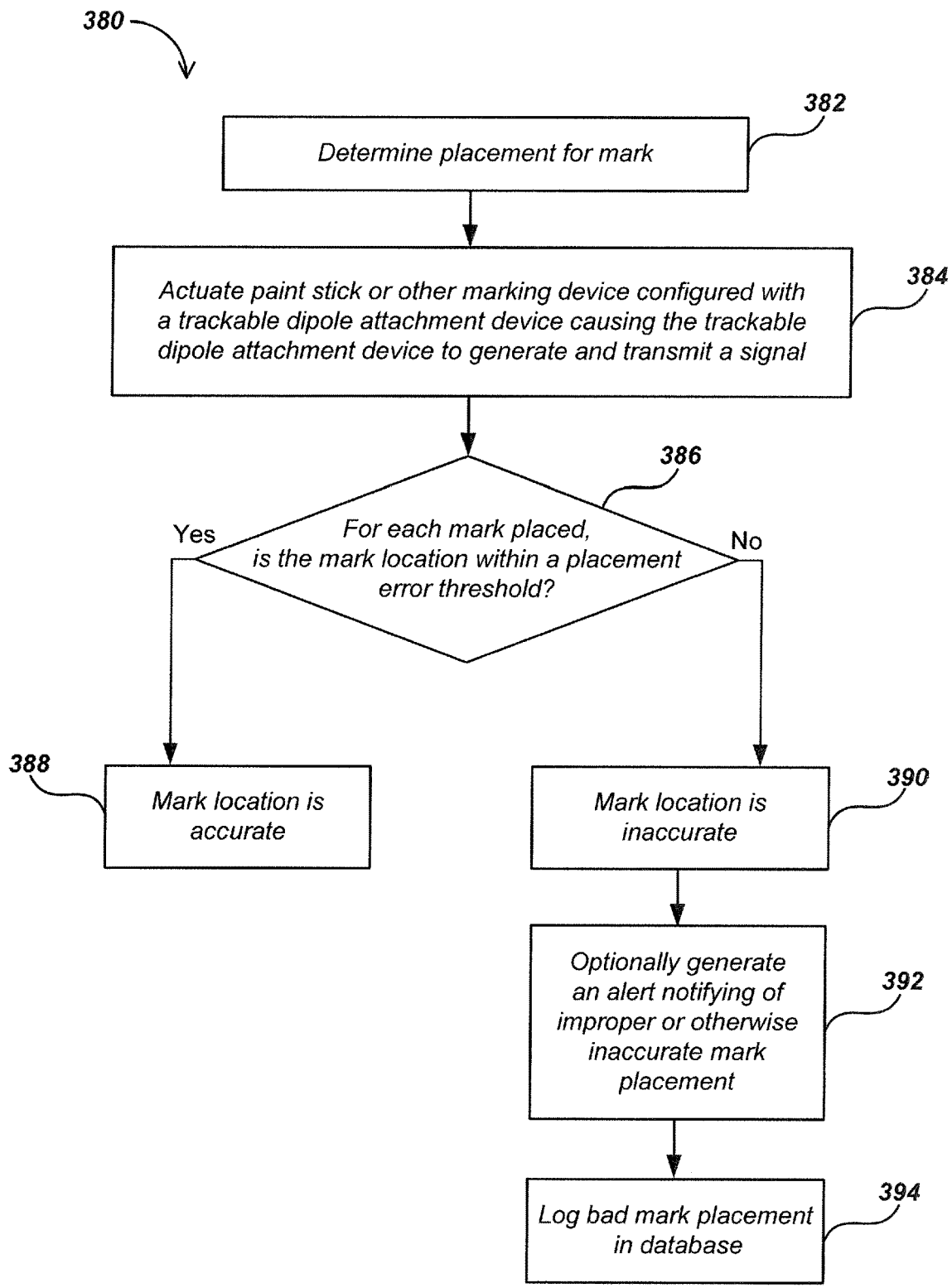
FIG. 3E is a quality control method embodiment for identifying and alerting of inaccurately placed marks.

Method embodiment 380 of FIG. 3E describes a method for verifying proper placement of marks, and may further be used to generate alerts of incorrectly placed marks.

In step 382, locate data including location of placed marks and location utility lines may be determined. Such information may, for instance, be provided through use of methods described in FIGS. 3A-3C. Such information may further include historic data of known utility locations.

In step 384, the location of each mark may be compared to the location of known utilities.

In step 386, a determination must be made as to whether the location of each mark falls outside of an acceptable placement error threshold when compared to the location of utility lines. The placement error threshold may be set at a certain distance such that the utility line may be safely and efficiently excavated based on mapped location. In step 388, if the mark location is within the placement error threshold from step 386, the mark location is appropriate. If the mark location does not fall within the placement error threshold from step 386, in step 390 the mark location may be deemed to be inaccurate.

In step 392, an alert may be issued about the improper or otherwise inaccurate mark placement, thereby allowing for the placement of the mark to be corrected. In some embodiments, an alert may be issued in a remote system during post-processing for monitoring locate quality.

In step 394 the bad mark placement and/or corrections may be logged into a database.

In some locating system embodiments, trackable dipole devices may be used with other types of marking devices besides paint sticks. For example, flag or whisker dispensing marking devices may include or be coupled to a trackable dipole device. In such embodiments, actuation or control of the trackable dipole device may occur simultaneously with or through the dispensing of the particular marker.

Figure 1C:
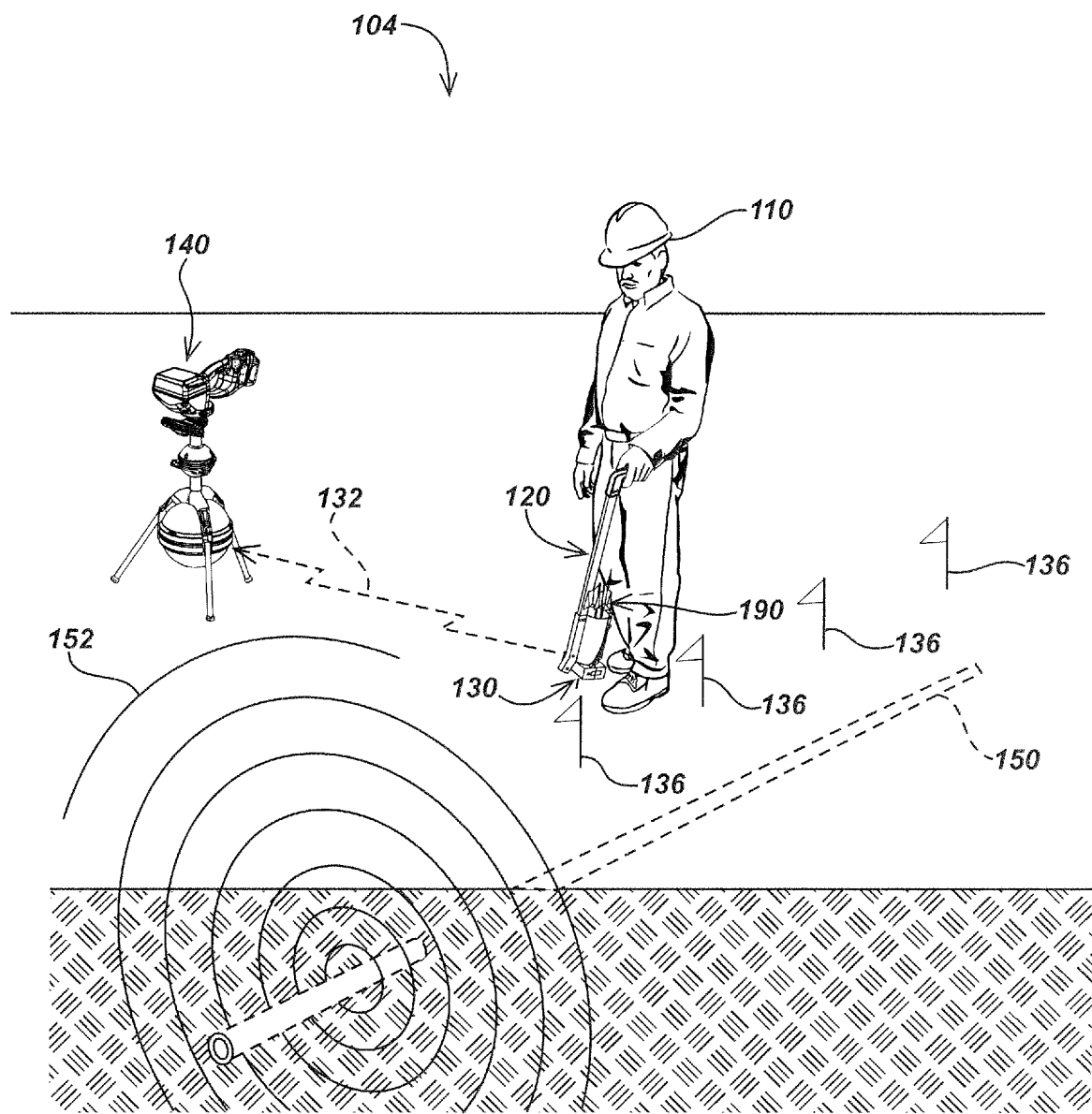
FIG. 1C is an illustration of another utility locating and marking system embodiment.

One such alternative marker type system is illustrated in system 104 of FIG. 1C. System 104 of FIG. 1C may share elements of system 102 of FIG. 1B with the paint canister 122 replaced with a flag dispensing adapter 190. The flag dispensing adapter 190 may be configured to dispense flags 136 rather than create paint marks such as the mark 132 of FIG. 1B. In such embodiments, the electromagnetic signal 134 may be transmitted from trackable dipole device 130 when a flag 136 has been dispensed and may be received at the utility locator 140, where it is processed to determine location data of each flag 136. The location of each flag 136 as determined by the utility locator 140 may be recorded in a memory and may be further included on a locate map containing additional locate information. The trackable dipole devices herein may be used or adapted for use with other commercially available flag or whisker dispensing marking devices. In alternative embodiments, a user may, subsequent to the placement of flags or whiskers, create a virtual mark at each flag/whisker marker location. Such embodiments may include a user placing an additional physical marker at the same location (e.g., paint spray from a paint stick embodiment equipped with a trackable dipole device on top of the flag/whisker) or placing only a virtual mark at the same location (e.g., actuate an empty paint stick embodiment equipped with a trackable dipole device or a virtual marking device as illustrated in embodiment 1150 of FIG. 11B at each flag/whisker location).

Figure 4A:
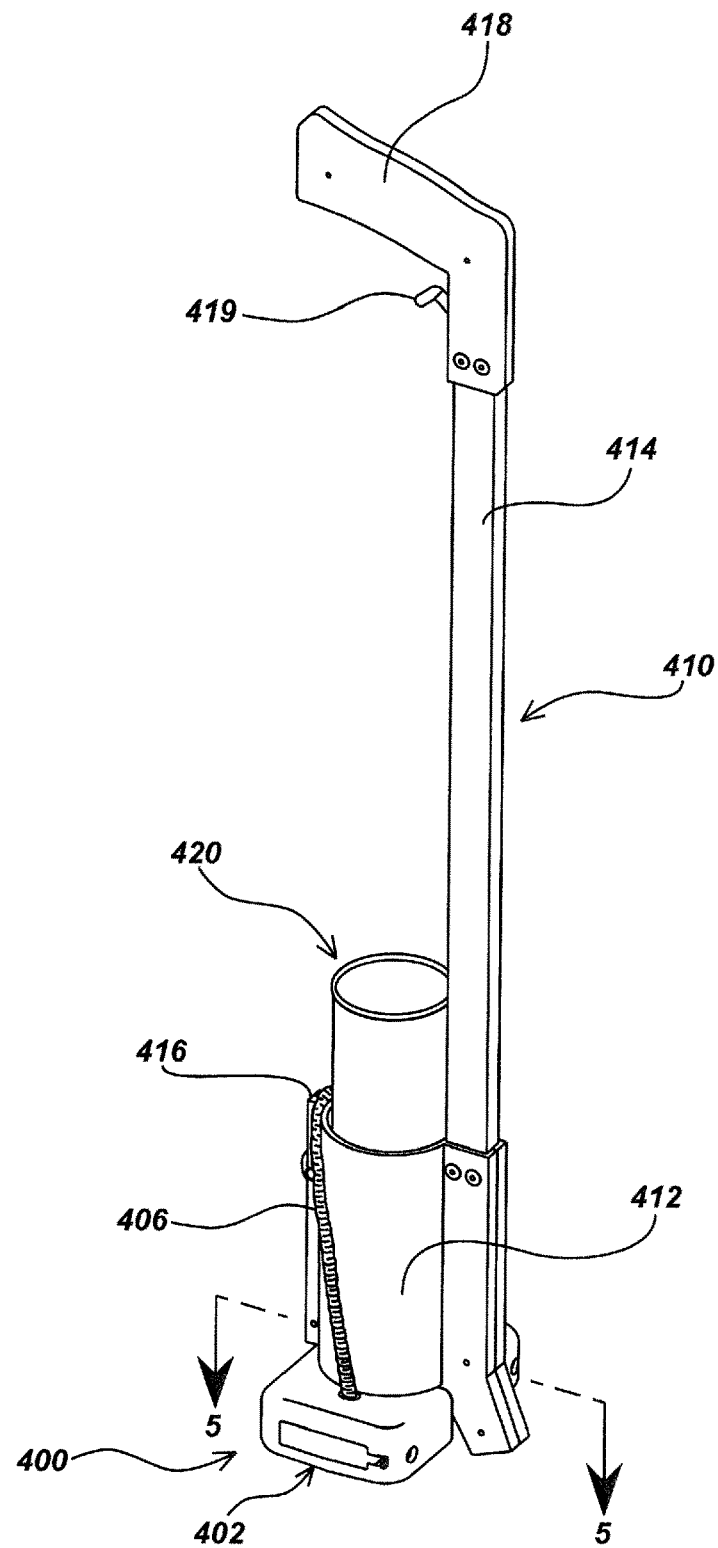
FIG. 4A is an isometric view of a trackable dipole device embodiment secured to a marking paint stick, with a paint canister.

Additional details of various embodiments of trackable dipole devices are illustrated in FIG. 4A to FIG. 8. These various embodiments may correspond with the trackable dipole device 130 shown in FIGS. 1A-2B and may be used in implementation of the methods of FIGS. 3A-3E. For example, as illustrated in FIGS. 4A and 4B, a trackable dipole device 400, in attachable/detachable form, may include a dipole device body 402 including a housing surrounding and enclosing a dipole antenna and shaped to seat at the distal end of a paint stick 410, below a tubular paint canister holder 412. The paint canister holder 412 may be positioned along the bottom of the paint stick body (comprising mast 414). The body assembly 402 of the trackable dipole device 400 may seat below the canister holder 412 in assembly. In some embodiments, one or more additional dipole antennas or dipole tracking sondes/beacons may be provided in or coupled to the paint stick 410, such as on the mast 414 and/or at other suitable places on the paint stick 410, to improve accuracy of the paint stick's position, calculation or tracking.

A paint passage collar 404 (partially obstructed in FIG. 4B) may have a cylindrical top portion that may fit and seat within the bottom of canister holder 412 in assembly. The bottom portion of paint passage collar 404 (best illustrated in FIG. 6B) may be housed within the body assembly 402 such that the cylindrical top portion of the paint passage collar 404 (FIG. 4B) protrudes above the top surface of body assembly 402. The paint passage collar 404 (best illustrated in FIG. 6B) may further include a passage through which, in use, paint or other marker material may pass through.

Figure 4B:
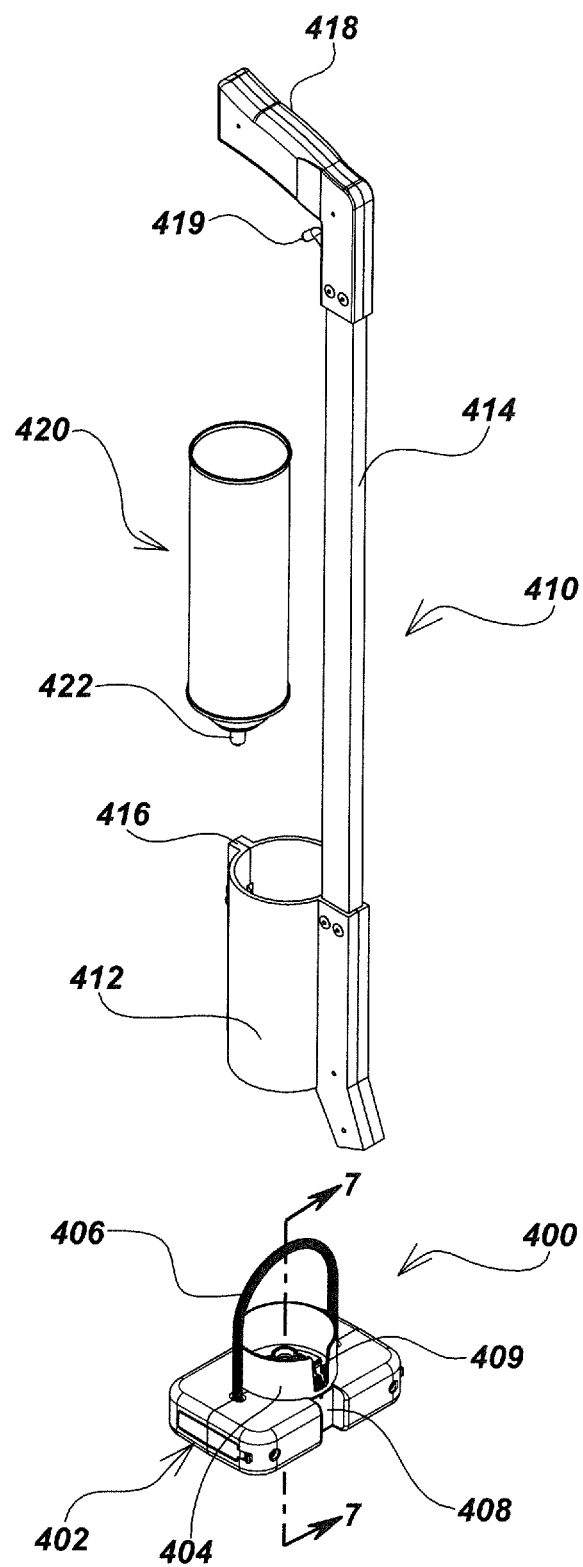
FIG. 4B is an exploded view of the trackable dipole device, paint stick device, and paint canister embodiments of FIG. 4A.

Still referring to FIGS. 4A and 4B, the trackable dipole 400 may include a securing spring 406 for securing the trackable dipole device 400 to paint stick 410. The securing spring 406 may attach in two or more spots on the top surface of the body assembly 402, such as on opposite sides from where the cylindrical portion of the paint passage collar 404 (partially obscured in FIG. 4B) protrudes. In assembly, the securing spring 406 may be stretched and seated on a ledge 416 formed along the back paint canister holder 412 or to a similar location and mechanism along paint stick 410, providing tension and allowing the trackable dipole device 400 to be removably secured thereto.

The securing spring 406 may be used to allow the trackable dipole device 400 to readily attach to various commercially available marking paint sticks. A groove 408 (FIG. 4B) may be formed along the side of trackable dipole device 400, facing towards paint stick 410, such that in assembly a lower portion of mast 414 may seat within groove 408. A notch 409 (FIG. 4B) formed along the edge of the cylindrical top portion of the paint passage collar 404 (partially obscured in FIG. 4B) may also face inward toward paint stick 410, allowing for paint actuating elements of the paint stick 410 (e.g., actuation arm 530 of FIG. 5) to pass through and physically press a nozzle 422 (FIG. 4B) on paint canister 420 to spray paint on the ground or other surface. In use, a user may grip a handle 418 on the paint stick 410 and press a trigger 419 causing nozzle 422 (FIG. 4B) to be displaced and paint to be dispensed from the paint canister 420. The movement action displacing nozzle 422 may further be used to actuate or otherwise control the trackable dipole device 400 such as is described in greater detail subsequently herein.

Figure 4C:
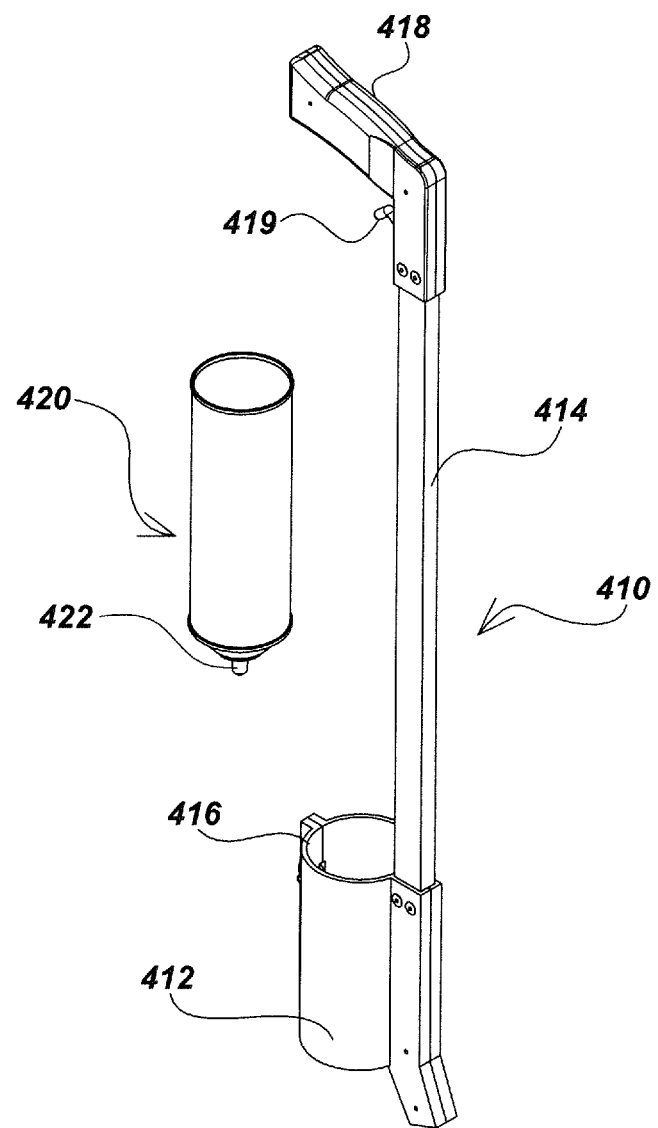
FIG. 4C is another exploded view of the trackable dipole device having utility designator elements, paint stick device, and paint canister embodiments.
Figure 4C:
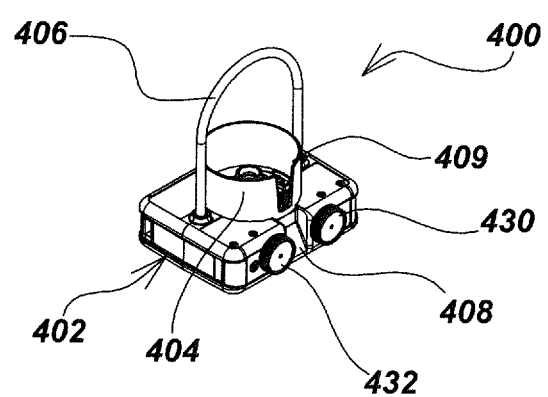
Figure 4D:
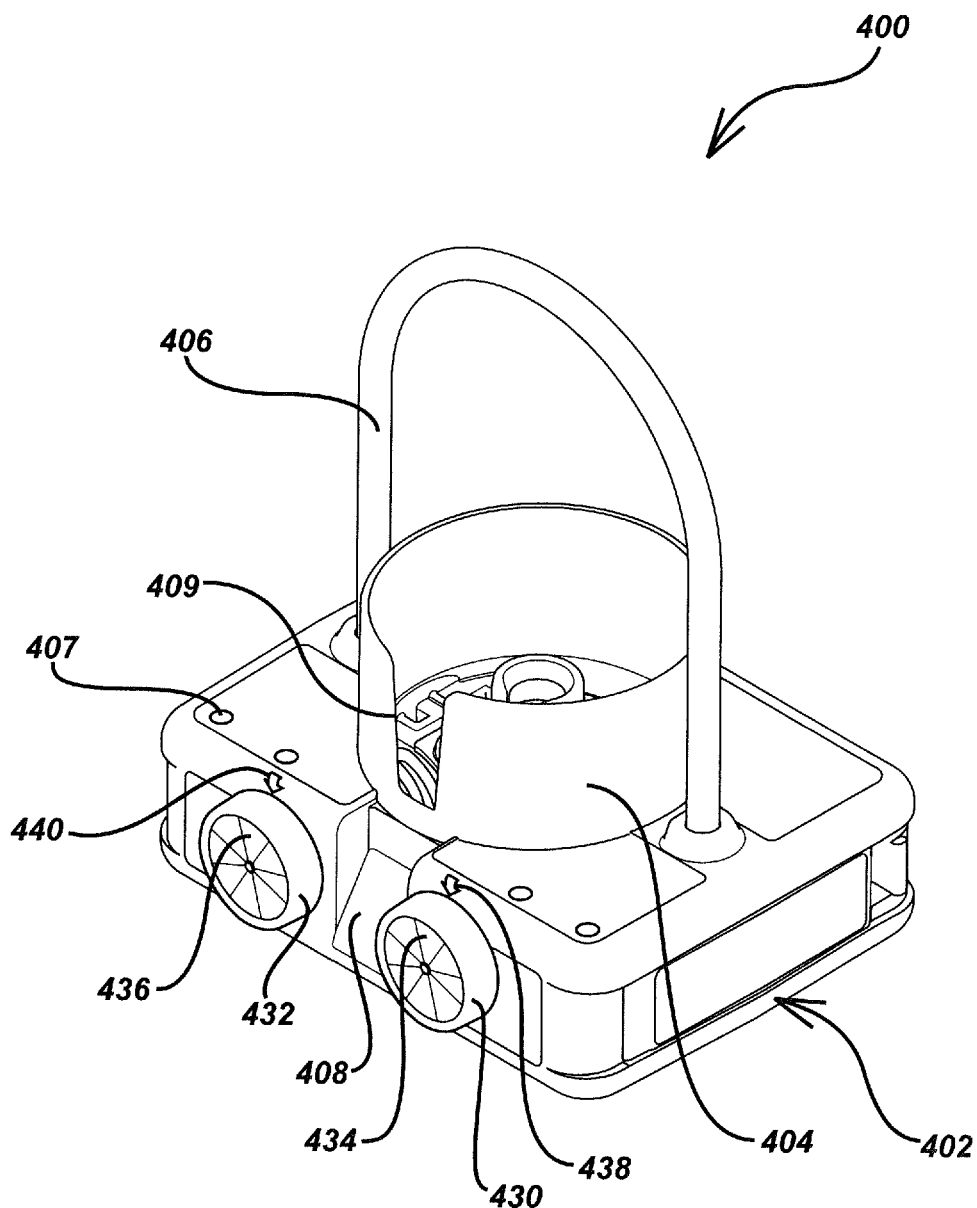
FIG. 4D is an isometric view of the trackable dipole device embodiment having utility designator elements.

As illustrated in FIGS. 4C and 4D, the trackable dipole device 400, according to another embodiment, may include one or more utility designator elements, such as utility designator knobs or dials 430, 432 to allow a user to select and designate the type of utility and/or other utility designation parameters. In some embodiments, a plurality of indicators, such as indicator recesses 434, 436 (as shown in FIG. 4D) may be provided on respective utility designator elements 430, 432 (e.g., on its outer circumference) to designate different types of utilities. These indicator recesses 434, 436 may include text, numbers, icons, symbols, and/or color indicators, either individually or in multiple different combinations, to represent different utility types and/or other utility designation parameters. In certain embodiments, text, colors and/or iconography commonly used in the industry may be used to notate the various utility types on the utility designator element(s) 430, 432. Further, arrow indicators 438, 440 (as shown in FIG. 4D) may be provided on the body assembly 402 of the trackable dipole device 400 for alignment to the utility type to be designated. In one embodiment, a pair of utility designator elements may be provided, each having eight indicator slots facilitating designation of sixteen different utilities. In some embodiments, one or more light indicators such as LEDs 407 (as shown in FIG. 4D may be provided to indicate a user of a status of an actuator such as an active trigger pull or release, and other useful indications such as low battery.

The utility designator element(s) 430, 432 may include one or more mechanical elements, a sensor assembly having one or more magnetic sensors, and an electronic circuitry to determine a user-selected utility type. In operation, one or more utility designator element(s) 430, 432 such as utility designator dial or knob may be actuated (e.g., rotated) by a user to a desired setting, which may be a utility type (e.g., gas, water, electric, sewer, etc.) or other utility designation parameters. Upon actuation, the sensor assembly may be used to detect the position and/or subsequent change of position due to rotations of the corresponding utility designator element(s) 430, 432. The detected position may be used to determine a selected utility type. Upon detection, the electronic circuitry may generate an output signal corresponding to the selected utility type and/or state indication of the corresponding utility designator element(s) 430, 432, and provide the output signal to a locator, such as utility locator 140.

At the locator, the output signal may be processed to obtain utility designation data (e.g., type of utility and/or other parameters associated with the utility), which may thereafter be associated with the location information pertaining to the mark and stored in a non-transitory memory associated with the locator. In some embodiments, a locator display, for example, the display 220 as shown in FIG. 2C, may be modified to provide an indication of a current state (e.g., the selected utility type) of the utility designator element(s) 430, 432.

Figure 4E:
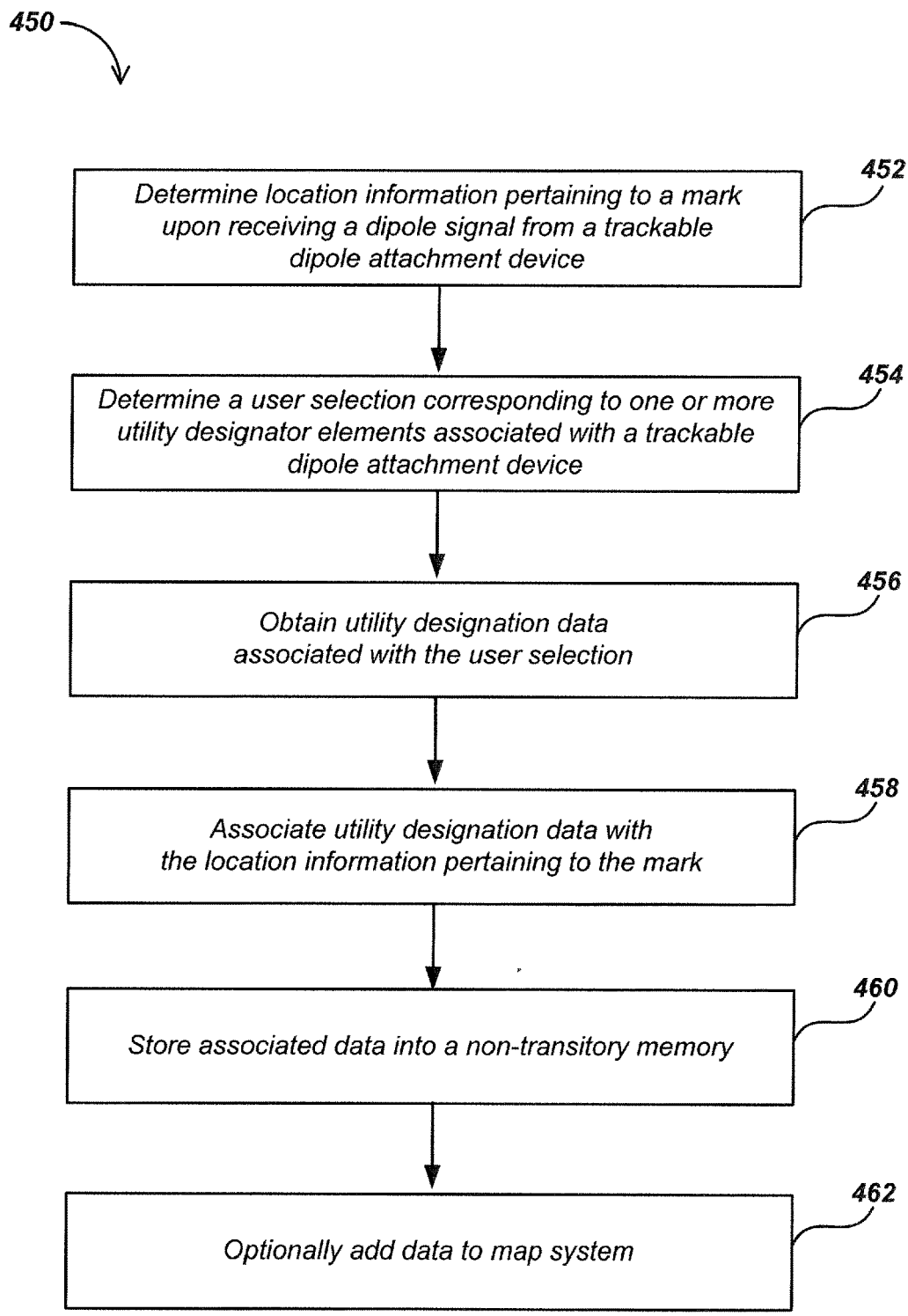
FIG. 4E is an embodiment of another method for using a utility locating and marking system for designating buried utility assets.

Turning to FIG. 4E, an embodiment of a method 450 for using a utility locating and marking system for designating buried utility assets, is illustrated.

A first step 452 of method 450 may include determining location information pertaining to the mark upon receiving a dipole signal from a trackable dipole attachment device. In an embodiment, location of the mark may be determined, for example, based on executing the method 320 described previously with reference to the FIG. 3B.

At step 454, a user selection corresponding to one or more utility designator elements associated with the trackable dipole attachment device are determined. In some embodiments, upon determining the type of utility during a locating and/or marking operation, a user may select and designate the utility. The selection may be made upon user's actuation (e.g., rotation) of the one or more utility designator element(s) 430, 432 to a desired setting indicating a selected utility type (e.g., gas, water, electric, sewer, or the like). A sensor assembly within the trackable dipole attachment device may sense the selected utility type upon detection of the position and/or subsequent change of position due to rotations of the corresponding utility designator element(s) 430, 432. Subsequent to detection, an electronic circuitry within the trackable dipole attachment device may generate an output signal corresponding to the selected utility type and/or state indication of the corresponding utility designator element(s) 430, 432 and provide the output signal to a utility locator, such as the locator 140.

At step 456, utility designation data associated with the user selection is obtained at the locator 140. The locator 140 may include one or more processing elements to receive and process the output signal generated by the electronic circuitry of the trackable dipole attachment device to obtain utility designation data, which includes data pertaining to the selected utility type and/or other utility designation parameters.

At step 458, the utility designation data obtained from the step 456 may be associated with the location information pertaining to the mark. For example, at the locator 140, the utility designation data obtained at the step 456 may be associated with the location information pertaining to the mark determined at the step 452. The association may be a one-to-one correspondence or another known form of data linkage that may be carried out based on predefined association rules.

At step 460, the associated data from the step 458 may be stored into a non-transitory memory. The non-transitory memory may be an internal memory of the locator 140. Alternatively, the non-transitory memory may be an external memory accessible to the locator 140. The stored data may be retrieved for various purposes including, but not limited to, generation of maps.

In an optional step 462, the utility designation data and associated information pertaining to the location of the mark may be included in a map or mapping system covering the locate area.

Turning to FIG. 5, which further illustrates the trackable dipole device having the paint passage collar 404 including a nozzle actuator 510 seated within the cylindrical top portion, the nozzle actuator 510 (as shown in the FIG. 5) may be retained within the cylindrical top portion of the paint passage collar 404 through retaining nubbins 502. Nozzle actuator 510 may be allowed to move laterally beneath retaining nubbins 502 in direction 520 when sufficient force is applied to overcome the tension provided by arm features 514 of the nozzle actuator 510 pressed into stop nubbins 504. Such force may be supplied by an actuation arm 530 moving in direction 520 caused when the trigger 419 (FIGS. 4A and 4B) of paint stick 410 (partially obscured in FIG. 5) has been pulled.

Movement of actuation arm 530 along direction 520 may move nozzle actuator 510 and then move the nozzle 422 of paint canister 420 (FIG. 4B), causing paint to be dispensed therefrom. In assembly, the nozzle 422 of paint canister 420 (FIG. 4B) may further be seated within a nozzle retaining feature 512 formed along the top portion of the nozzle actuator 510 such that force along direction 520 may force both the nozzle 422 and nozzle actuator 510 to move simultaneously in a lateral direction 520. The nozzle retaining feature 512 and nozzle actuator 510 may be formed such that in the absence of a paint canister, such as the paint canister 420 of FIGS. 4A and 4B, the actuation arm 530 may contact the nozzle retaining feature 512 on nozzle actuator 510 to cause actuating displacements when a force in direction 520 is applied and thus a signal and a virtual mark may be created. The nozzle retaining feature 512 and nozzle actuator 510 and paint passage collar piece 404 may further be formed such that the paint dispensed from nozzle 422 may be unobstructed and allowed to pass through to create a mark on the ground or other surface.

Upon releasing the trigger 419 (FIGS. 4A and 4B), arm features 514 on nozzle actuator 510 pressed into stop nubbins 504 along the circumference of the cylindrical top portion of paint passage collar piece 404 may provide a restoring force to restore the nozzle actuator 510 in the absence of a force in direction 520. In some embodiments, the two arm features 514 (as shown in FIG. 5) may be combined into a single arm feature pressed into the stop nubbins 504. A magnet 516 may seat on nozzle actuator 510 such that it may move relative to a magnetic sensor (e.g., magnetic sensor 612 of FIG. 6A) within body assembly 402 (FIGS. 4A and 4B). Measured displacement of magnet 516 relative to the corresponding magnetic sensor (e.g., magnetic sensor 612 of FIG. 6A) may be used to actuate or control the trackable dipole device 400.

The nozzle actuator 510 may further be configured to readily be removed without the need for tools by a user and replaced or cleaned as needed. For instance, the side of the nozzle actuator 510 having arm features 514 may pull upward and away from stop nubbins 504. The nozzle actuator 510 may then slide laterally along a direction contrary to direction 520 until freed from retaining nubbins 502. Reversing such a procedure may allow the user to readily reinstall a new or cleaned nozzle actuator 510 once again without the need for tools.

Figure 6A:
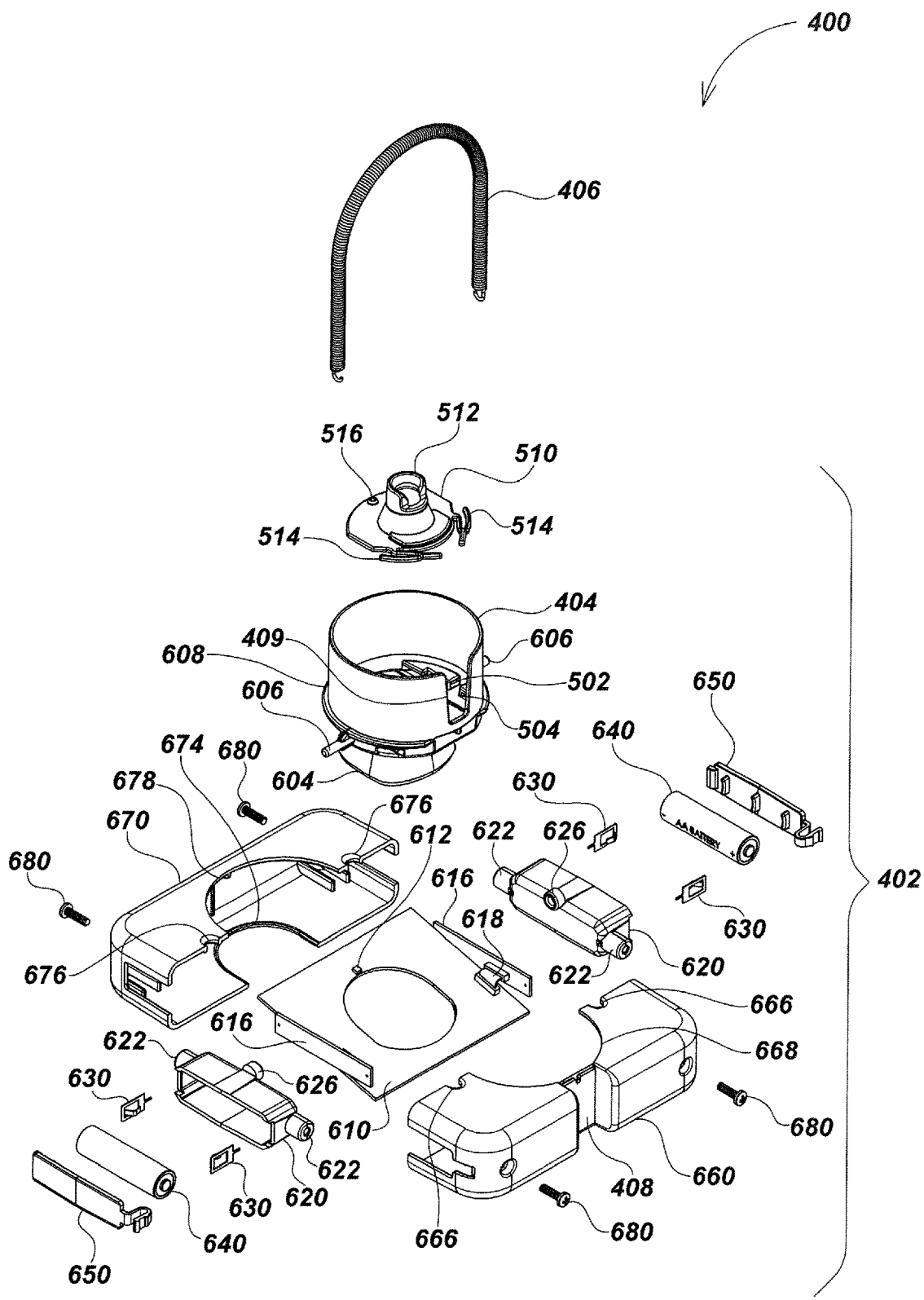
FIG. 6A is a top down exploded view of the trackable dipole device embodiment of FIG. 4A.
Figure 6B:
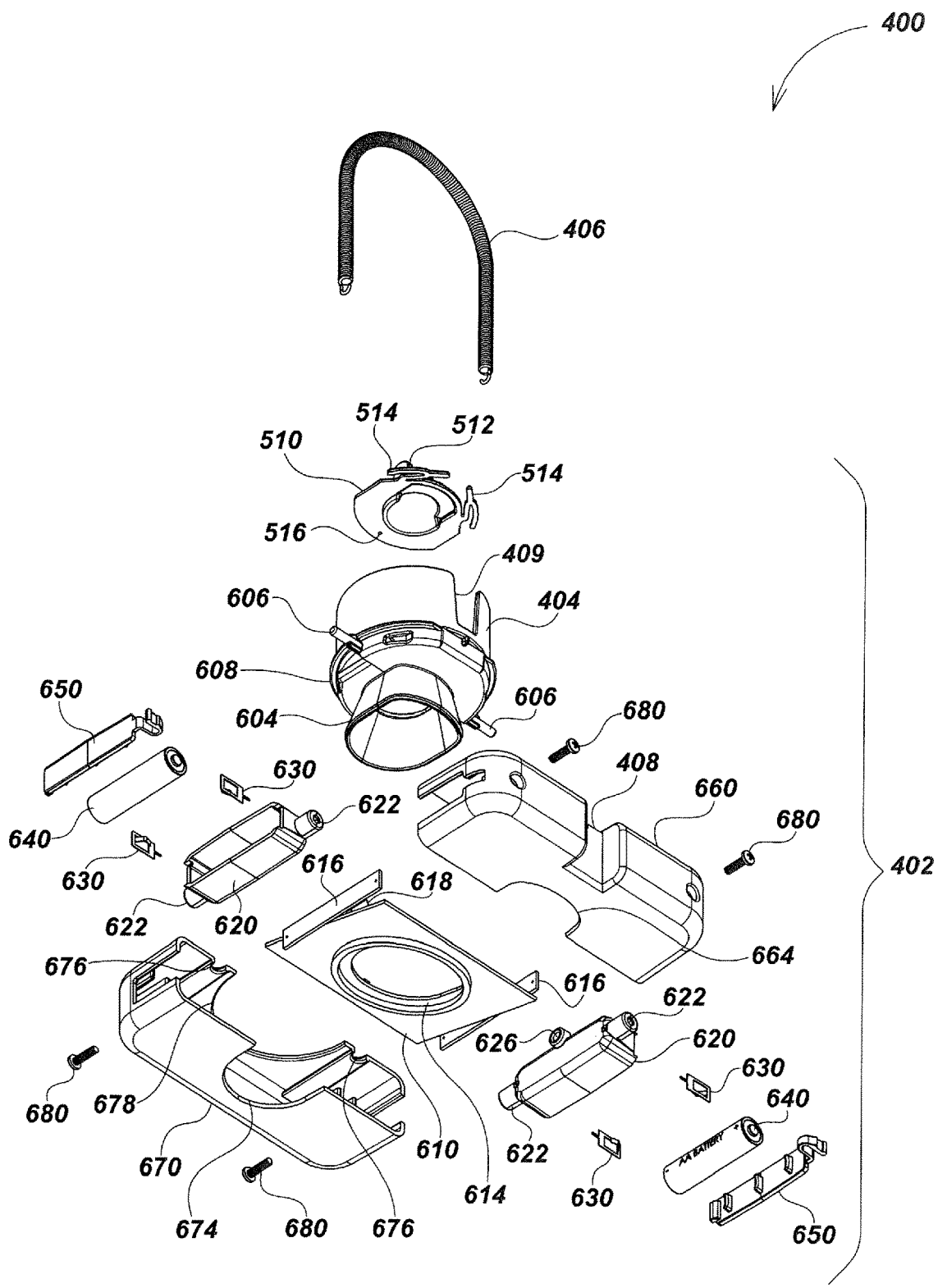
FIG. 6B is a bottom up exploded view of the trackable dipole device embodiment of FIG. 4A.

Turning to FIGS. 6A and 6B, a lower paint passage portion 604 may fit through an opening within a PCB 610 in assembly. The PCB 610 may contain a magnetic sensor 612 (FIG. 6A) which may be a Hall Effect sensor or similar magnetic sensor configured to measure displacements of magnet 516 seated in a known relative position on nozzle actuator 510. Along the bottom of PCB 610, an antenna coil 614 may be configured to transmit electromagnetic signals. A pair of side PCBs 616 may connect to PCB 610 via connectors 618 or another type of connector(s). Each side PCB 616 may seat along a battery compartment piece 620 situated on two opposite sides of PCB 610. Battery terminals 630 may pass through each battery compartment piece 620 and electrically connect batteries 640 to side PCBs 616 and thereby the overall trackable dipole device 400. A battery compartment door 650 may seal each battery 640 within its battery compartment piece 620 and protect components therein from the external environment. Each battery compartment door 650 may be configured to be readily opened and/or removed by a user allowing for batteries 640 to be replaced as needed.

A body front half 660 and body back half 670 may, in assembly, fit together and encapsulate the PCB 610, side PCBs 616, connectors 618, antenna coil 614, and magnetic sensor 612 (FIG. 6A) as well as the battery compartment pieces 620 with batteries 640 and battery terminals 630 secured in place. The lower part of the paint passage collar 404 may further sit within the body front half 660 and body back half 670 such that the lower lip formed along the lower paint passage portion 604 may fit snugly about the passage formed by a lower front half groove 664 (FIG. 6B) and a lower back half groove 674 in assembly. A top lip feature 608 formed partially about the circumference of paint passage collar piece 404 may seat snugly below a top front half groove 668 (FIG. 6A) and a top back half groove 678 in assembly along the top surface of body assembly 402. A front spring retaining groove half 666 may be formed along each side of the top front half groove 668 (FIG. 6A) on the body front half 660 configured to mate with back spring retaining groove half 676 formed along each side of the top back half groove 678 on the body back half 670 in assembly such that the ends of securing spring 406 may secure therein.

Post features 606 along two opposite sides of the paint passage collar 404 may mate with post hole features 626 on each battery compartment piece 620 securing the paint passage collar 404 and battery compartment pieces 620 together in assembly. A set of screws 680 may thread into screw hole features 622 on either side of each battery compartment piece 620 securing the body front half 660 and body back half 670 together. When the body front half 660 and body back half 670 are assembled, the battery compartment doors 650 may be externally accessible along either side of the body assembly 402. In some embodiments, the post features 606 on the paint passage collar 404 may be eliminated and other securing means may be provided within the body front half 660 and the body back half 670 facilitating the paint passage collar 404 to fit in.

Figure 7:
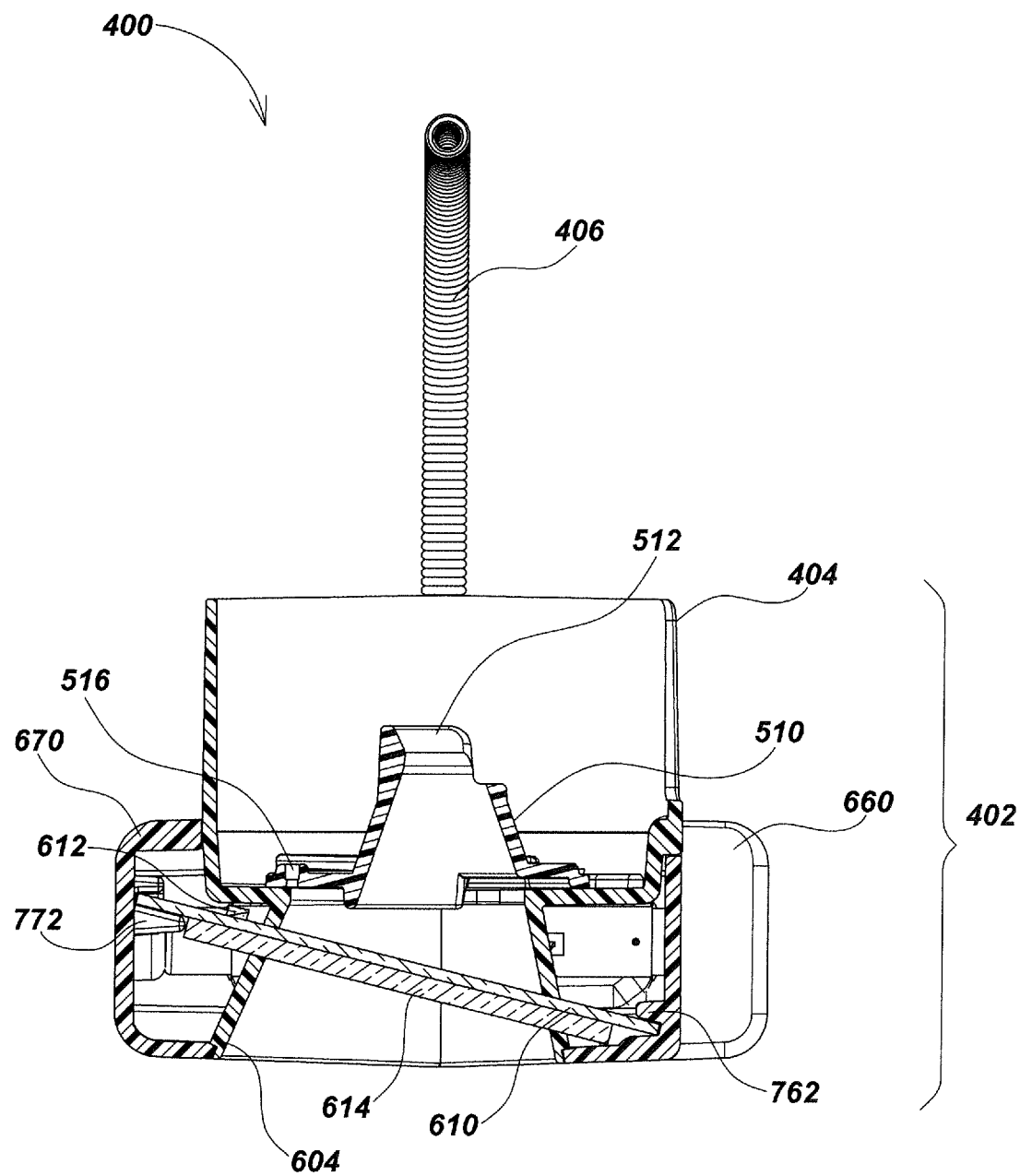
FIG. 7 is a section view of the trackable dipole device embodiment of FIG. 4B seen along line 7-7.

As illustrated in FIG. 7, a series of front body tilt support features 762 formed within the body front half 660 and a series of back body tilt support features 772 may be formed within the body back half 670. In use, the tilt support features 762 and 772 may hold the PCB 610 containing the antenna coil 614 at an angle.

Figure 8:
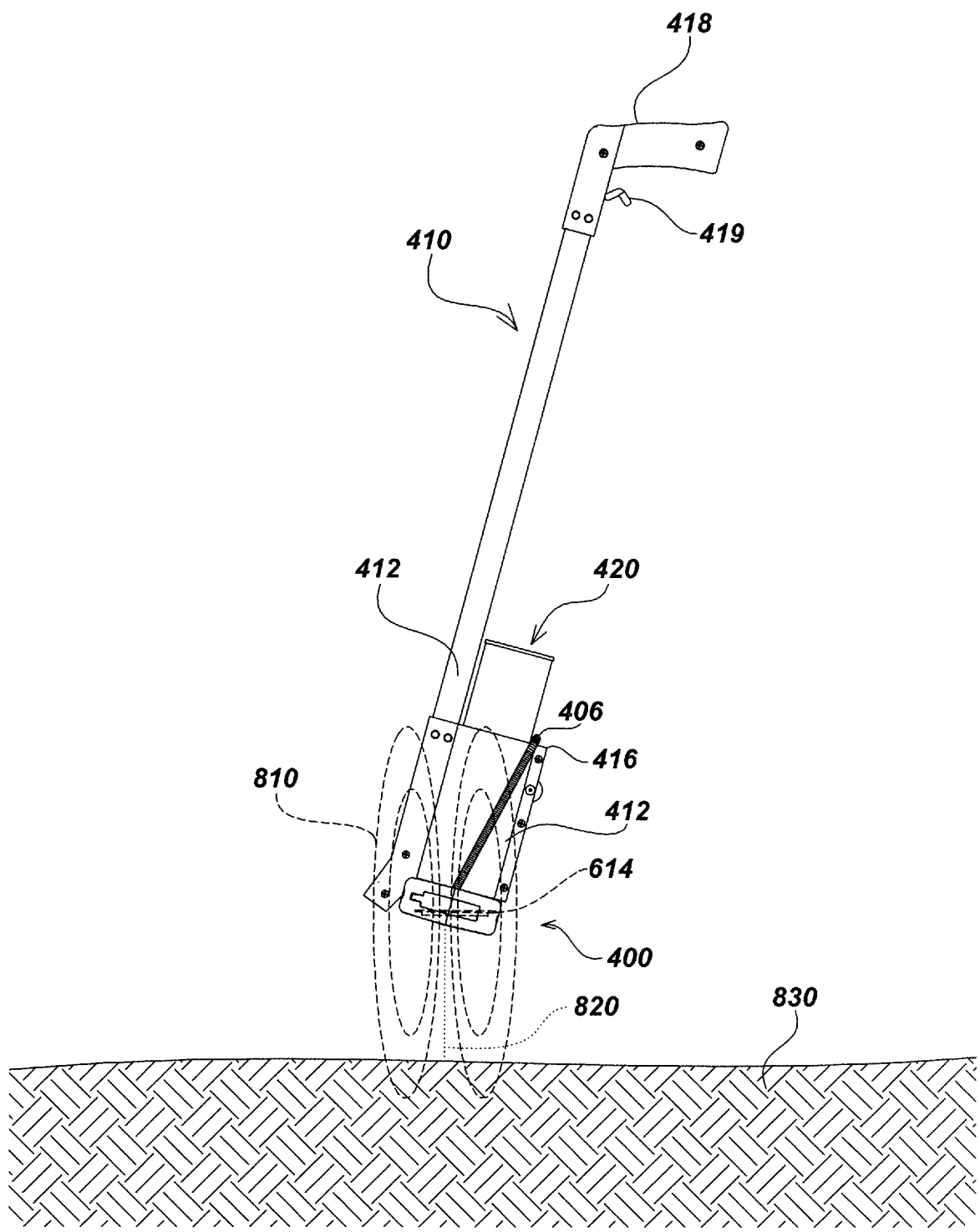
FIG. 8 is an illustration of the trackable dipole device, paint stick device, and paint canister embodiments of FIG. 4A illustrating tilt of the antenna coil and alignment with paint spray.

Turning to FIG. 8, the angle of antenna coil 614 may allow the axis of the transmitted signal 810 to align with the spray direction 820 of paint as it is dispensed from paint canister 420. By aligning paint spray direction 820 and the axis of signal 810, a calculation may be made to approximate the offset of mark location on the ground surface 830.

Figure 9:
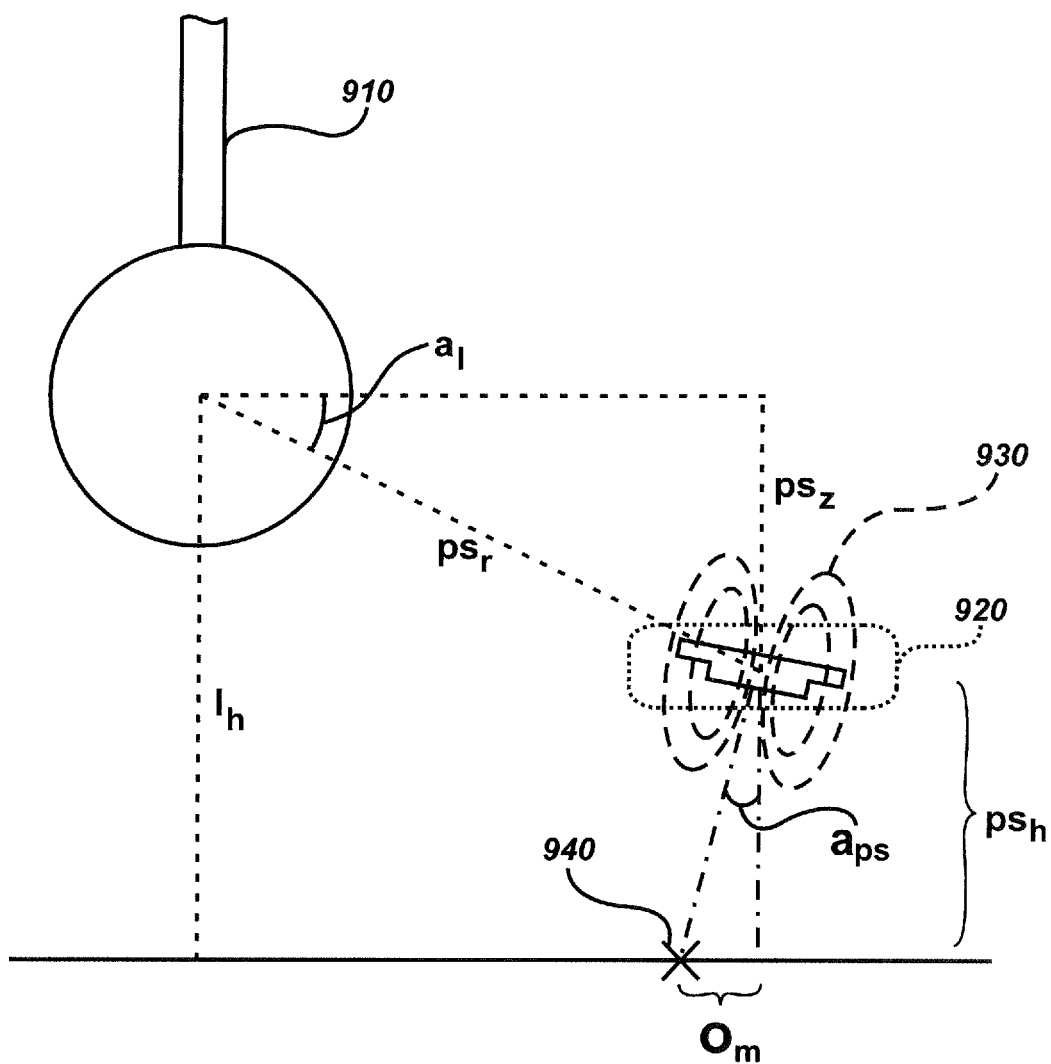
FIG. 9 is an illustration of a utility locator and trackable dipole device embodiment illustrating finding the offset for the refined mark location.

As illustrated with FIG. 9, values for the radial distance ps, with an angle $a_l$ from the horizontal plane from the center of the antenna node at the utility locator 910 towards the origin of signal 930 from the trackable dipole device 920 may be determined from method 300 illustrated in FIG. 3A. Furthermore, orientation of signal 930 may be determined from method 300 illustrated in FIG. 3A such that a tilt angle $a_{ps}$ value in a known orientation direction is determined. The height of the utility locator 910 from the ground surface may be determined based on sensor data as described in various incorporated patents and patent applications. For instance, optical ground tracking methods and or approximate normal usage height may be used to further determine a value for $l_h$ which may be the distance from the ground surface to the center of the antenna array. Range finders and/or other like sensors and devices may further be used to determine a $l_h$ value. The height of the trackable dipole device 920 may be notated herein as $ps_h$. The difference in height between the center of the antenna node at the utility locator 910 and trackable dipole device 920 may be notated herein as $ps_r$. Within FIG. 9, the offset measurement of a mark 940 from the trackable dipole device 920 location above the ground surface is defined as $o_m$. Based on a calculated $o_m$ as described in method 1000 of FIG. 10, and the known orientation of the tilt of signal 930, a refined mark location may be determined.

Figure 10:
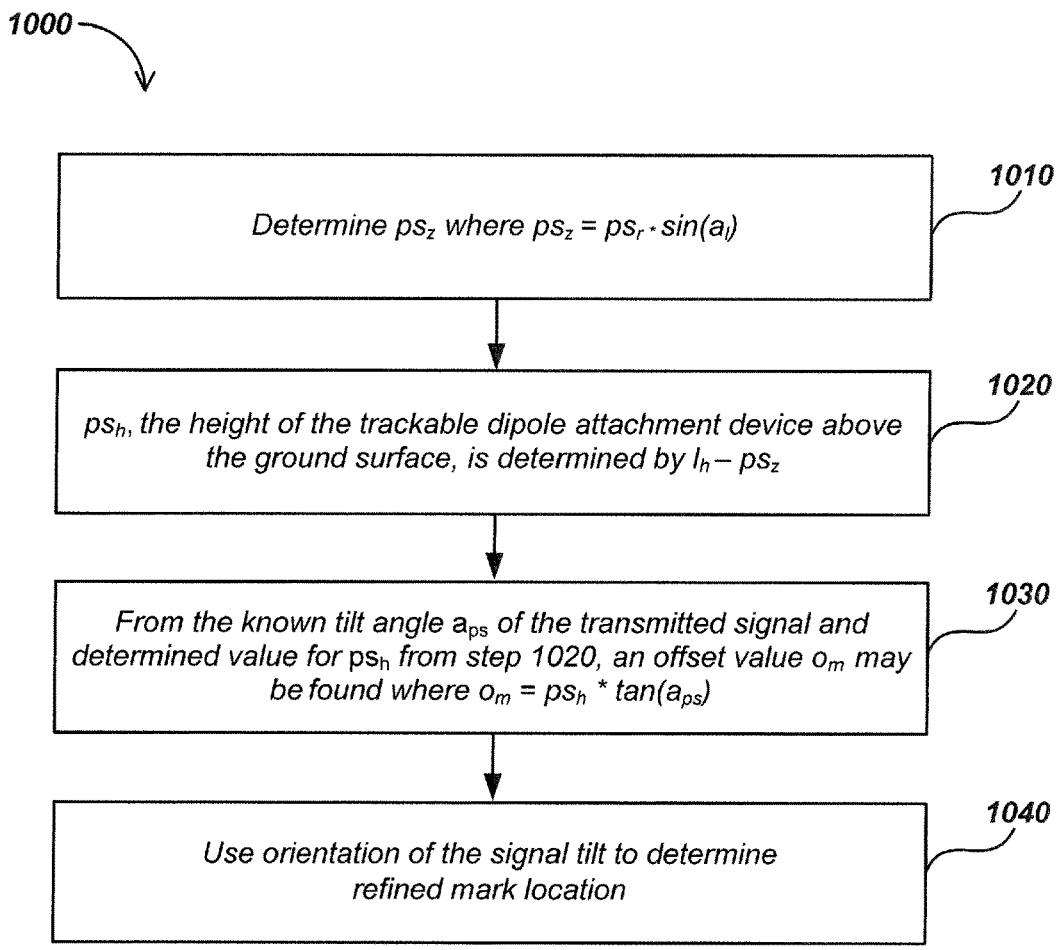
FIG. 10 is an embodiment of a method for finding a refined mark location.
Figure 11A:
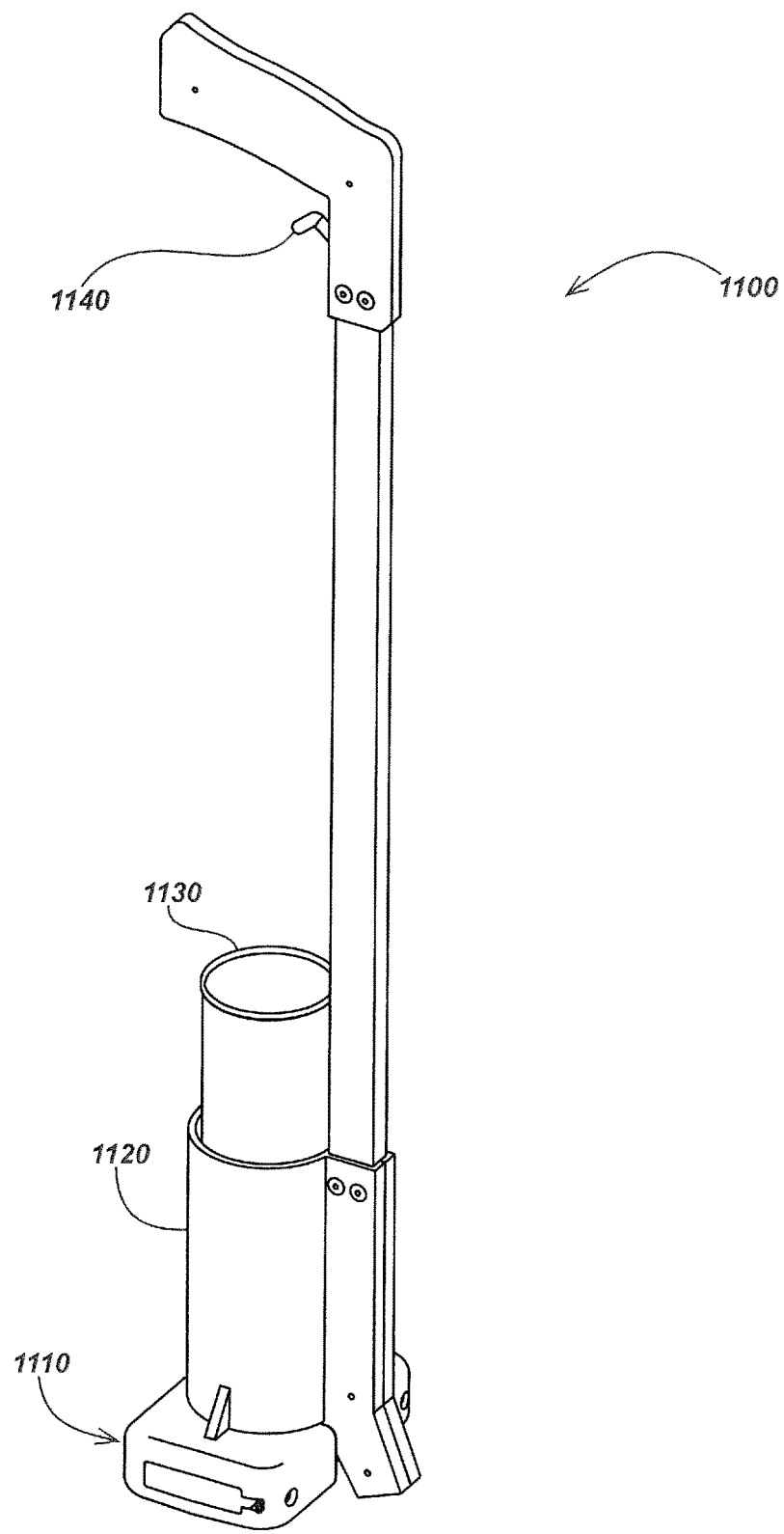
FIG. 11A is an integrated marking device embodiment.
Figure 11B:
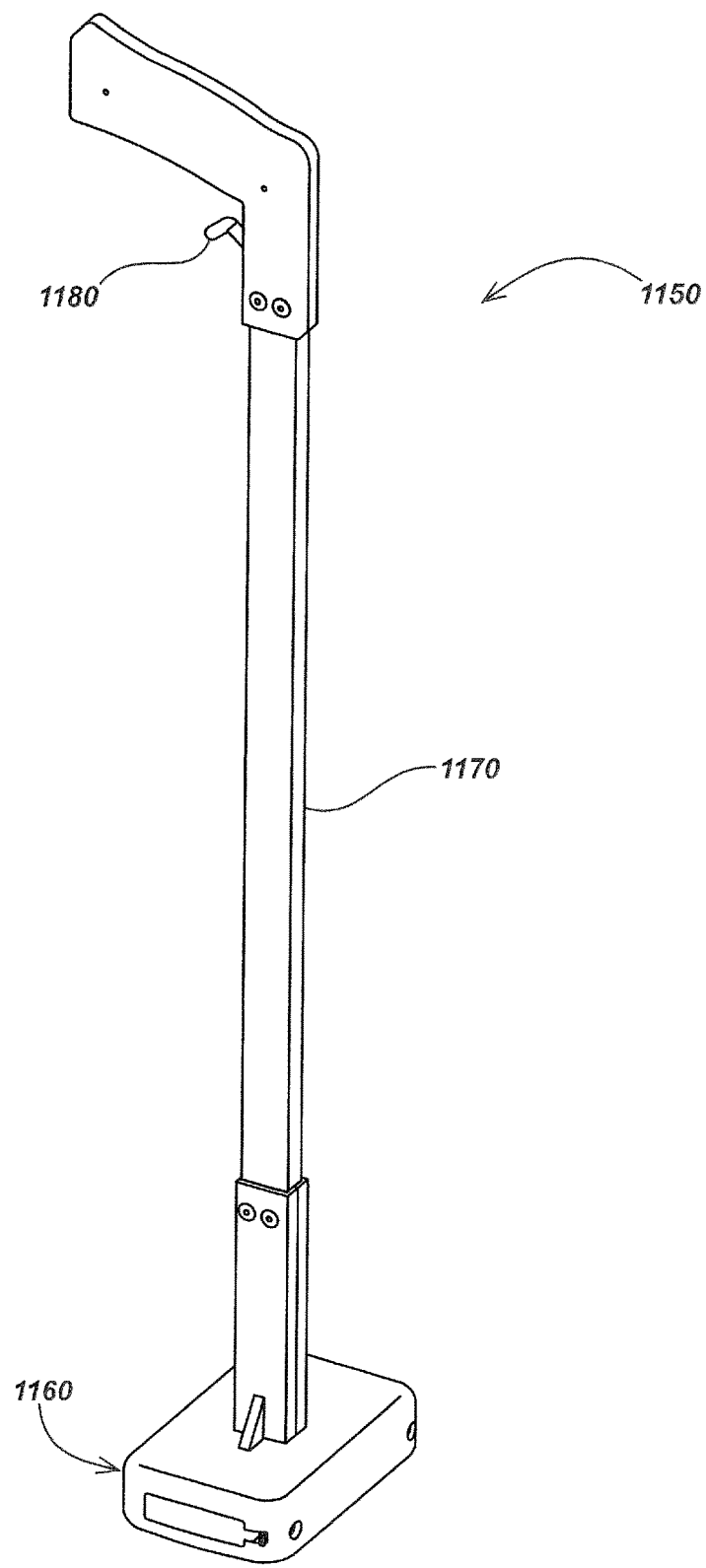
FIG. 11B is a virtual marking device embodiment.
Figure 12:
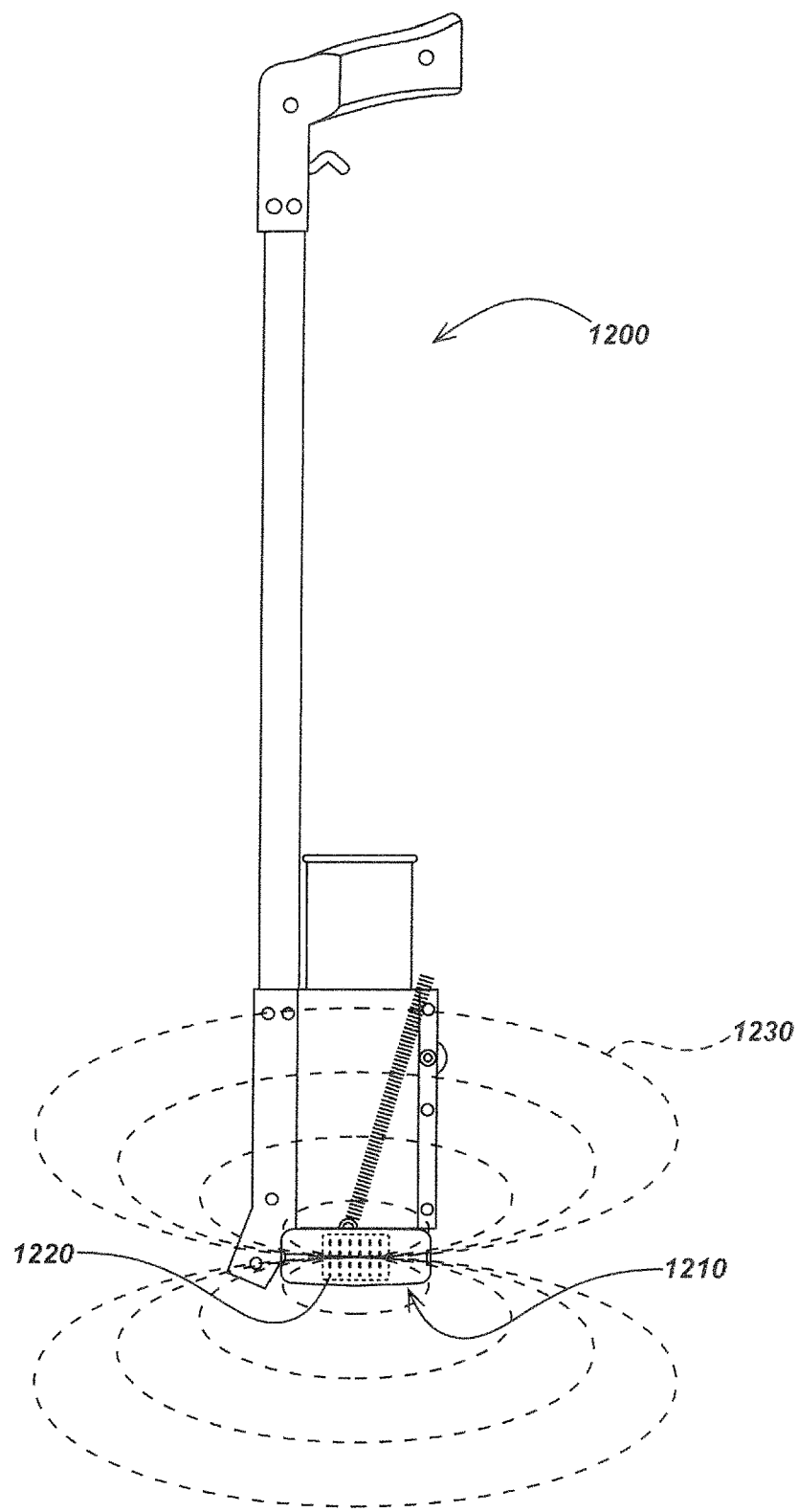
FIG. 12 is a trackable dipole device embodiment with differently oriented antenna coils.

As illustrated within FIG. 10, a method embodiment 1000 may be used to find a refined mark. Method 1000 uses notation and terms defined with FIG. 9 and the correlating specification description. In step 1010, $ps_z$ may be calculated where $$ps_z = ps_r * \sin(a_l).$$

In step 1020, $ps_h$, the height of the trackable dipole device above the ground surface, may be determined by $l_h - ps_z$. In step 1030, from the known tilt angle $a_{ps}$ value of the transmitted signal and determined value for ps, at step 1020, an offset value $o_m$ may be found, where $$o_m = ps_h * \tan(a_{ps}).$$

In step 1040, the orientation direction of signal tilt may be used to determine the refined mark location. For example, offset value $o_m$ may determine that the refined mark location may exist along a circle at a radial distance $ps_r$ from the trackable dipole device's position above the ground surface. The tilt orientation of the signal may allow for the refined mark location to be determined along that circle defined by radial distance $ps_r$.

In some embodiments, the various components, including signal generating and transmitting components or other transmitting elements, may be built into an integrated paint marking device embodiment. For instance, integrated paint stick 1100 of FIG. 11A may include a trackable dipole element 1110 built into the bottom of a paint canister holder 1120. The paint canister holder 1120 may seat a paint canister 1130. Paint may be dispensed from the paint canister 1130, and one or more electromagnetic signals may be generated by the integrated paint stick device 1100 upon pressing of trigger 1140.

In some embodiments, the signal transmitting components and/or one or more processing element(s) in the integrated paint marking device embodiment may be configured for multiplexing the dipole generated output signals, in time and/or frequency to simplify the signal reception thereof and/or to improve the tracking accuracy of the paint marking device.

In further embodiments, a marking device may be configured to only create virtual marks. For instance, the virtual marking device 1150 illustrated in FIG. 11B may include a trackable dipole element 1160 built into a mast 1170. One or more electromagnetic signals may be generated by the integrated paint stick device 1150 upon pressing of trigger 1180 allowing a virtual mark to be created in an associated utility locator corresponding to a buried utility line or other asset (absent physical paint being sprayed on the ground). In yet further embodiments, such virtual marking elements and/or functionality and associated components may be included into utility locators and/or other system devices.

In some embodiments, the signals emitted from tracking devices need not be centered and/or align with the exiting direction of associated marker material (e.g., paint spray). For example, paint stick marking device 1200 of FIG. 12 may include a trackable dipole device 1210 having an antenna coil 1220 in an orientation configured to generate a signal 1230. The antenna coil 1220 and associated signal 1230 may be oriented horizontally as opposed to the largely vertically oriented antenna coils and signals (e.g., signal 810 from antenna coil 614 of the trackable dipole device 400 illustrated in FIG. 8).

Figure 13:
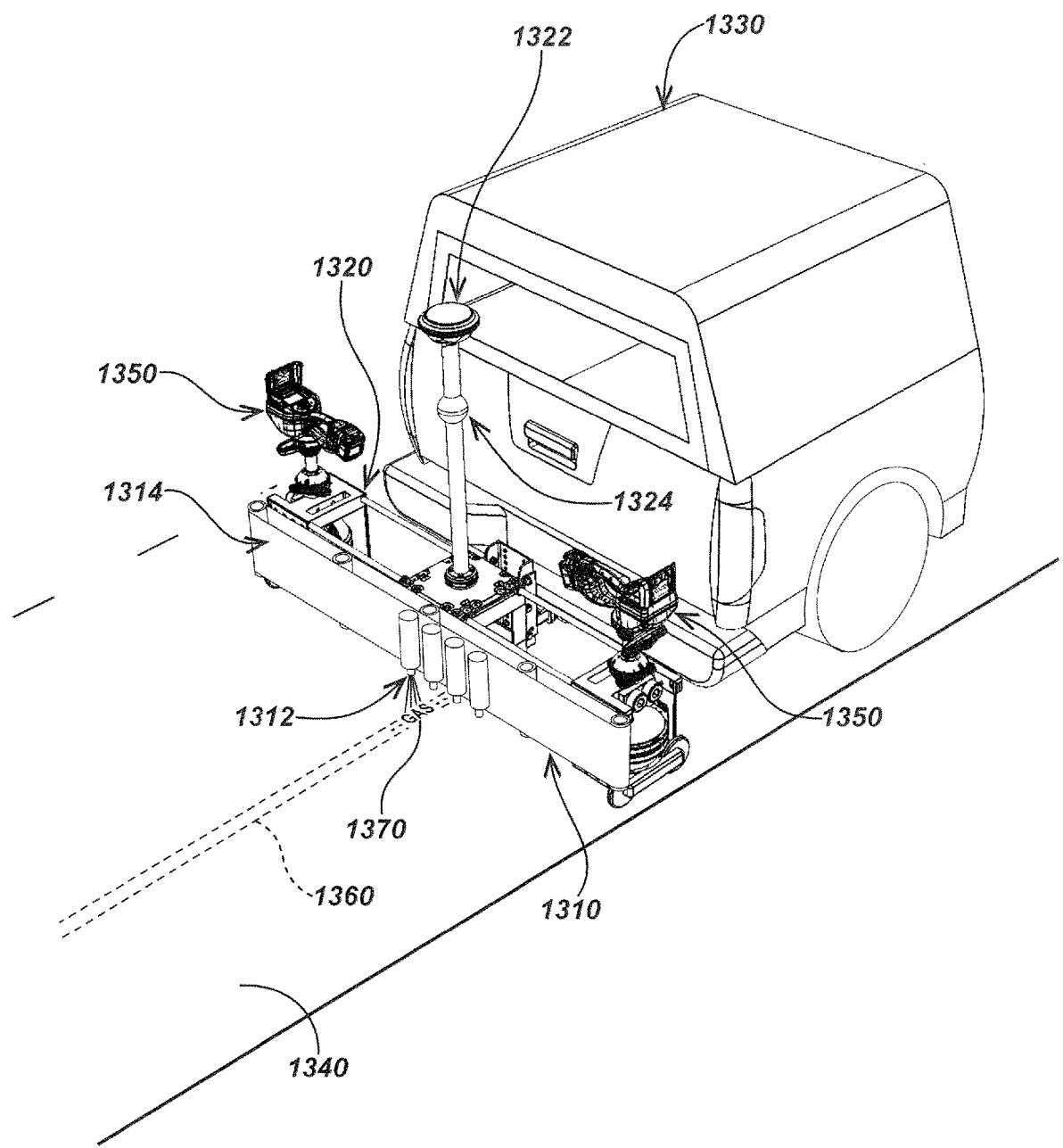
FIG. 13 is a trackable marking device embodiment for vehicle mounted utility locating and mapping systems.

Some marking device embodiments for creating trackable marks may be coupled to a vehicle, along with corresponding vehicle utility locators and mapping devices. As illustrated in FIG. 13, such a marking device 1310 may be disposed on a vehicle mounted utility locating and mapping device 1320. The vehicle mounted utility locating and mapping device 1320 may secure to a vehicle 1330 as it is driven down a road, such as road 1340 as shown. As the utility locating and mapping device 1320 moves down road 1340, one or more utility locators 1350 within the vehicle mounted utility locating and mapping device 1320 may measure electromagnetic signals emitted from one or more utility lines 1360 or other buried assets in order to determine their location, depth, and/or orientation as well as other locate details. The vehicle mounted utility locating and mapping device herein may include inertial sensors, satellite navigation systems, and/or other position determining systems and sensors. For instance, vehicle mounted utility locating and mapping device 1320 may include RTK GPS 1322 in a known orientation and configured to communicate with utility locators 1350 providing precise positions for electromagnetic signals collected by utility locators 1350 and further correlated to utility line locations, depths, orientations, and/or other locate details in either real-time or in post processing. In some embodiments, a sonde beacon 1324 may be included on the mast of the RTK GPS 1322 discoverable at utility locators 1350.

Upon determining the location, orientation, and/or other locate details, marking device 1310 may generate a corresponding mark 1370 at the appropriate location and orientation. For example, a mark distribution mechanism 1312 of marking device 1310 may be configured to move along the width of the vehicle mounted utility locating and mapping device 1320 via a mark placement movement mechanism 1314. The mark placement movement mechanism 1314 may be belt driven or otherwise configured to move mark distribution mechanism 1312 and allow placement of marks to be located in different places where, for instance, one or more utility lines may run along the length of road 1340 perpendicular to utility line 1360.

In other embodiments, vehicle mounted utility locating and mapping devices may include multiple marking devices along the width thereof, allowing marks to be created at multiple locations, including multiple locations simultaneously. Creation of mark 1370 may occur in real-time or near real-time as utility lines, such as utility line 1360, may be located. In other embodiments, mark placement may come from post processed or historic data. For instance, an initial locate operation using a vehicle mounted utility locating and mapping device and/or other locating devices may first determine utility line location, orientation, depth, and/or other locate details. A vehicle with a marking device such as marking device 1310 may then drive the locate operation as marks are created from the historic and/or initial locate data.

The various illustrative logical blocks, modules, functions, and circuits described in connection with the embodiments disclosed herein and, for example, in a processing element as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing element may furthering include or be coupled to one or more non-transitory memory storage elements for storing instructions, data, and/or other information in a digital storage format.

In some configurations, embodiments of a smart paint stick device and/or associated locator may include means for performing various functions as described herein. In one aspect, the aforementioned means may be in a processing element using a processor or processors and associated memory in which embodiments reside, and which are configured to perform the functions recited by the aforementioned means. The aforementioned means may be, for example, modules or apparatus residing in a printed circuit board element or modules, or other electronic circuitry modules, to perform the functions, methods, and processes as are described herein. In another aspect, the aforementioned means may be a module or apparatus configured to perform the functions recited by the aforementioned means.

In one or more exemplary embodiments, the functions, methods and processes described may be implemented in whole or in part in hardware, software, firmware, or any combination thereof. If implemented in software, the functions may be stored on or encoded as one or more instructions or code on a non-transitory processor-readable medium and may be executed in one or more processing elements. Processor-readable media includes computer storage media. Storage media may be any available media that can be accessed by a computer, processor, or other programmable digital device.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any method claims may present elements of the various steps in a sample order, and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps may have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, methods, and/or circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other device. In the alternative, the processor and the storage medium may reside as discrete components. Instructions to be read and executed by a processing element to implement the various methods, processes, and algorithms disclosed herein may be stored in a memory or memories of the devices disclosed herein.

The scope of the present invention is not intended to be limited to the aspects shown herein, but is to be accorded the full breadth consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is noted that as used herein that the terms "component," "unit," "element," or other singular terms may refer to two or more of those members. For example, a "component" may comprise multiple components. Moreover, the terms "component," "unit," "element," or other descriptive terms may be used to describe a general feature or function of a group of components, units, elements, or other items. For example, an "RFID unit" may refer to the primary function of the unit, but the physical unit may include non-RFID components, sub-units, and such.

The previous description of the disclosed aspects is provided to enable any person skilled in the art to make or use various embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the appended claims and their equivalents.

We claim:

1. A paint marking stick for use with a utility locating and marking system, comprising:
    an elongate paint marking stick body having a proximal end and a distal end;
    a handle coupled at or near the proximal end of the marking stick body;
    a paint dispenser assembly coupled at or near the distal end of the marking stick body for dispensing paint;
    a trackable magnetic field dipole device including a body, a power supply, an alternating current (AC) signal generator, and a magnetic field dipole antenna operatively coupled to the AC signal generator for generating a magnetic field dipole signal at the AC frequency, the dipole device coupled at or near the distal end of the body;
    a mounting device for mounting a smart phone to the trackable magnetic field dipole device, wherein GPS location data and/or other system data collected by the smart phone may be wirelessly transmitted to a remote location, or to a cloud based network;
    an actuator; and
    an actuation apparatus operatively coupled to the actuator for deploying paint from the paint dispenser assembly and initiating generation of the magnetic field dipole signal from the trackable dipole device;
    wherein the magnetic field dipole signal is generated in conjunction with deployment of paint from the paint dispenser assembly.

2. The paint marking stick of claim 1, wherein the paint dispenser assembly includes a paint canister.

3. The paint marking stick of claim 1, wherein the actuator is disposed at least partially on or within the handle.

4. The paint marking stick of claim 1, wherein the actuator is manually user-triggered.

5. The paint marking stick of claim 1, wherein the actuator is automatically triggered in response to a sensor input.

6. The paint marking stick of claim 2, wherein the trackable dipole device includes a housing shaped to seat the trackable dipole device below the paint canister at the distal end of the body.

7. The paint marking stick of claim 1, wherein the trackable dipole device includes one or more utility designator elements, each including a sensor assembly and electronics, to sense a selected utility type on the corresponding utility designator elements and generate an output signal corresponding to the selected utility type.

8. The paint marking stick of claim 2, wherein the paint canister is at least partially tubular in shape to retain a cylindrical spray paint can.

9. The paint marking stick of claim 1, further including a recording device retainer accessory.

10. The paint marking stick of claim 1, wherein another signal is generated in conjunction with deployment of paint from the paint dispenser assembly to initiate a recording.

11. The paint marking stick of claim 10, wherein the recording comprises at least one of an audio recording and a video or image recording.

12. The paint marking stick of claim 1, wherein the generated magnetic field signal is modulated to correspond with deployment of paint from the paint dispenser.

13. A trackable dipole attachment for use with a paint marking stick in a utility locating and marking system, comprising:
   a body including an attachment mechanism to removably coupled the attachment to the paint marking stick, wherein the body includes one or more wireless communication devices;
   an alternating current (AC) signal generator;
   a magnetic field dipole antenna operatively coupled to an output of the AC signal generator, the dipole antenna positioned at or near the distal end of the body; and
   an actuation apparatus for deploying paint from the paint dispenser assembly and initiating generation of a magnetic field dipole signal in conjunction with dispensing of marking paint from the paint stick.

14. The trackable dipole attachment of claim 13, wherein the trackable dipole attachment device is removably attachable to the paint stick using a spring mechanism.

15. The trackable dipole attachment of claim 13, wherein the trackable dipole attachment device includes a housing shaped to seat below a paint canister at a distal end of the paint stick body.

16. The trackable dipole attachment of claim 13, further including a recording device retainer accessory.

17. The trackable dipole attachment of claim 13, further comprising a modulator circuit to modulate the AC signal responsive to actuation paint dispensing.

18. The trackable dipole attachment of claim 13, further comprising at least one sensor.

19. The trackable dipole attachment of claim 18, wherein the one or more sensors includes one or more of an imaging sensor, audio sensor, gyroscopic sensor, accelerometer, inertial sensors global positioning satellite (GPS) sensor, or other satellite navigation sensor.

* * * * *